US012191601B2

(12) United States Patent
Yamamoto et al.

(10) Patent No.: US 12,191,601 B2
(45) Date of Patent: Jan. 7, 2025

(54) FLOATING CONNECTOR AND FLOATING CONNECTOR ASSEMBLY

(71) Applicant: Japan Aviation Electronics Industry, Ltd., Tokyo (JP)

(72) Inventors: Yoshinobu Yamamoto, Tokyo (JP); Yuichi Uchiyama, Tokyo (JP); Shunsuke Tasaka, Tokyo (JP)

(73) Assignee: JAPAN AVIATION ELECTRONICS INDUSTRY, LTD., Tokyo (JP)

( * ) Notice: Subject to any disclaimer, the term of this patent is extended or adjusted under 35 U.S.C. 154(b) by 347 days.

(21) Appl. No.: 17/933,546

(22) Filed: Sep. 20, 2022

(65) Prior Publication Data

US 2023/0178933 A1 Jun. 8, 2023

(30) Foreign Application Priority Data

Dec. 7, 2021 (JP) ................................ 2021-198256

(51) Int. Cl.
*H01R 13/631* (2006.01)

(52) U.S. Cl.
CPC ................................ *H01R 13/6315* (2013.01)

(58) Field of Classification Search
None
See application file for complete search history.

(56) References Cited

U.S. PATENT DOCUMENTS 5,980,290 A 11/1999 Meynier et al.
8,197,287 B2 * 6/2012 Rosenberger ........ H01R 24/542 439/675
8,801,459 B2 * 8/2014 Mrowka ................ H01R 24/54 439/246
9,484,688 B2 * 11/2016 Hügel .................. H01R 24/542
(Continued)

FOREIGN PATENT DOCUMENTS

FR 2990069 A1 11/2013
JP 2006-134899 A 5/2006
(Continued)

OTHER PUBLICATIONS

Extended European Search Report dated Apr. 19, 2023 in corresponding European Patent Application 22204370.5.
(Continued)

*Primary Examiner* — Ross N Gushi
(74) *Attorney, Agent, or Firm* — Renner, Otto, Boisselle & Sklar, LLP

(57) ABSTRACT

Provided is a floating connector that maintains the stability of electrical connections and achieves size reduction. A floating connector includes a relay connector and a first connector. The relay connector includes a first terminal having a plurality of contact spring parts, and the plurality of contact spring parts are arranged in a circumferential direction of the first terminal. The first connector includes a second terminal where a tubular part is formed, and a spherical part is formed an inner periphery of the tubular part. The plurality of contact spring parts come into contact
(Continued)

with the spherical part in a state of being inserted into the tubular part of the second terminal. a distance from a center of the spherical part to a contact part between each of the contact spring parts and the spherical part of the second terminal is the same.

7 Claims, 20 Drawing Sheets

(56) References Cited

U.S. PATENT DOCUMENTS

| | | | | |
|---|---|---|---|---|
| 10,249,968 | B2 * | 4/2019 | Dandl | H01R 12/716 |
| 10,658,803 | B2 * | 5/2020 | Gartmann | H01R 13/506 |
| 10,916,902 | B2 * | 2/2021 | Maki | H01R 24/50 |
| 10,931,051 | B2 * | 2/2021 | Wang | H01R 13/2457 |
| 10,973,124 | B2 * | 4/2021 | Song | H01R 13/502 |
| 11,411,347 | B2 * | 8/2022 | Wu | H01R 24/50 |
| 11,411,360 | B2 * | 8/2022 | Jung | H01R 24/50 |
| 11,417,978 | B2 * | 8/2022 | Xie | H01R 13/112 |
| 11,539,167 | B2 * | 12/2022 | Volkov | H01R 13/635 |
| 11,677,196 | B2 * | 6/2023 | Tang | H01R 24/542<br>439/63 |
| 11,757,236 | B2 * | 9/2023 | Yamazaki | H01R 12/7082<br>439/607.34 |
| 11,916,340 | B2 * | 2/2024 | Gruber | H01R 13/052 |
| 2012/0142232 | A1 * | 6/2012 | Yin | H01R 13/6315<br>439/817 |
| 2014/0127940 | A1 | 5/2014 | Wagner | |
| 2021/0399506 | A1 * | 12/2021 | Blasick | H01R 43/20 |
| 2022/0368051 | A1 * | 11/2022 | Asano | H01R 12/91 |
| 2022/0393410 | A1 * | 12/2022 | Asano | H01R 24/38 |
| 2022/0399683 | A1 * | 12/2022 | Asano | H01R 24/542 |
| 2023/0056565 | A1 * | 2/2023 | Chen | H01R 31/06 |
| 2023/0118648 | A1 * | 4/2023 | Burris | H01R 13/50<br>439/74 |
| 2023/0163498 | A1 * | 5/2023 | Asano | H01R 24/50<br>439/66 |
| 2023/0291149 | A1 * | 9/2023 | Tanaka | H01R 24/54 |
| 2024/0275092 | A1 * | 8/2024 | Asano | H01R 12/73 |
| 2024/0283202 | A1 * | 8/2024 | Huang | H01R 24/50 |
| 2024/0332873 | A1 * | 10/2024 | Chen | H01R 24/50 |
| 2024/0339792 | A1 * | 10/2024 | Chen | H01R 24/50 |
| 2024/0347988 | A1 * | 10/2024 | Chen | H01R 12/716 |

FOREIGN PATENT DOCUMENTS

| | | | |
|---|---|---|---|
| JP | 4061117 | B2 | 3/2008 |
| JP | 2014-123482 | A | 7/2014 |
| JP | 5748311 | B2 | 7/2015 |
| JP | 2019-40799 | A | 3/2019 |
| WO | 2012/119826 | A1 | 9/2012 |
| WO | 2021/095486 | A1 | 5/2021 |

OTHER PUBLICATIONS

European Office Action dated May 3, 2023 in corresponding European Patent Application 22204370.5.

* cited by examiner

FLOATING CONNECTOR AND FLOATING CONNECTOR ASSEMBLY

INCORPORATION BY REFERENCE

This application is based upon and claims the benefit of priority from Japanese patent application No. 2021-198256, filed on Dec. 7, 2021, the disclosure of which is incorporated herein in its entirety by reference.

BACKGROUND

The present disclosure relates to a floating connector and a floating connector assembly.

In a general floating connector assembly, when a first connector and a second connector are electrically connected through a relay connector, a connection axis between the first connector and the relay connector and a connection axis between the second connector and the relay connector can be out of alignment in some cases. In such cases, contact pressures on a plurality of contact parts between the first connector and the relay connector are different from one another, for example, which can degrade the stability of electrical connections.

Thus, according to the structure of a floating connector assembly 100 disclosed in Japanese Patent No. 5748311 shown in FIG. 20, even when a connection axis between a first connector 101 and a relay connector 103 and a connection axis between a second connector 102 and the relay connector 103 are out of alignment, contact pressures on a plurality of contact parts between the first connector 101 and the relay connector 103 are substantially the same.

To be specific, in the floating connector assembly 100, a distal end of a terminal 101a of the first connector 101 is inserted into one end of the relay connector 103 in a cylindrical shape, and a distal end of the second connector 102 is inserted into the other end of the relay connector 103.

The first connector 101 has a spherical part at the distal end of the terminal 101a of the first connector 101, and this spherical part is inserted into one end of the relay connector 103. In this structure, even when the connection axes are out of alignment in the floating connector assembly 100, the distance between each contact part of one end of the relay connector 103 with the spherical part of the first connector 101 and the center of the spherical part are substantially equal, so that contact pressures on the respective contact parts are substantially the same.

SUMMARY

In the floating connector assembly 100 disclosed in Japanese Patent No. 5748311, the spherical part of the terminal 101a of the first connector 101 is inserted into the relay connector 103. Thus, the relay connector 103 circumscribes the spherical part of the terminal 101a of the first connector 101.

Therefore, the relay connector 103 needs to be formed larger than the diameter of the spherical part of the terminal 101a of the first connector 101, which causes an increase in size of the relay connector 103 and the floating connector assembly 100.

An object of the present disclosure is to implement a floating connector and a floating connector assembly that maintain the stability of electrical connections and achieve size reduction.

A floating connector according to one aspect of the present disclosure is a floating connector constituting a part of a floating connector assembly including a first connector electrically connected to first equipment, a second connector electrically connected to second equipment, and a relay connector inserted into the first connector and also inserted into the second connector to electrically connect the first connector and the second connector, wherein the floating connector includes the relay connector and the first connector, the relay connector includes a first terminal having a plurality of contact spring parts arranged at intervals in a circumferential direction of the first terminal, the first connector includes a second terminal where a tubular part is formed, the tubular part having a spherical part on an inner periphery thereof, the plurality of contact spring parts come into contact with the spherical part in a state of being inserted into the tubular part of the second terminal, and when the relay connector rotates with respect to the first connector, a distance from a center of the spherical part to a contact part between each of the contact spring parts and the spherical part of the second terminal is the same.

According to the present disclosure, there are implemented a floating connector and a floating connector assembly that maintain the stability of electrical connections and achieve size reduction.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment will be described hereinafter with reference to FIGS. 1 to 19. First, the structure of a floating connector assembly according to this embodiment will be described. Note that, in the following description of the structure of the floating connector assembly, the Cartesian coordinate system (XYZ coordinate system) will be used to clarify the description.

Figure 1:
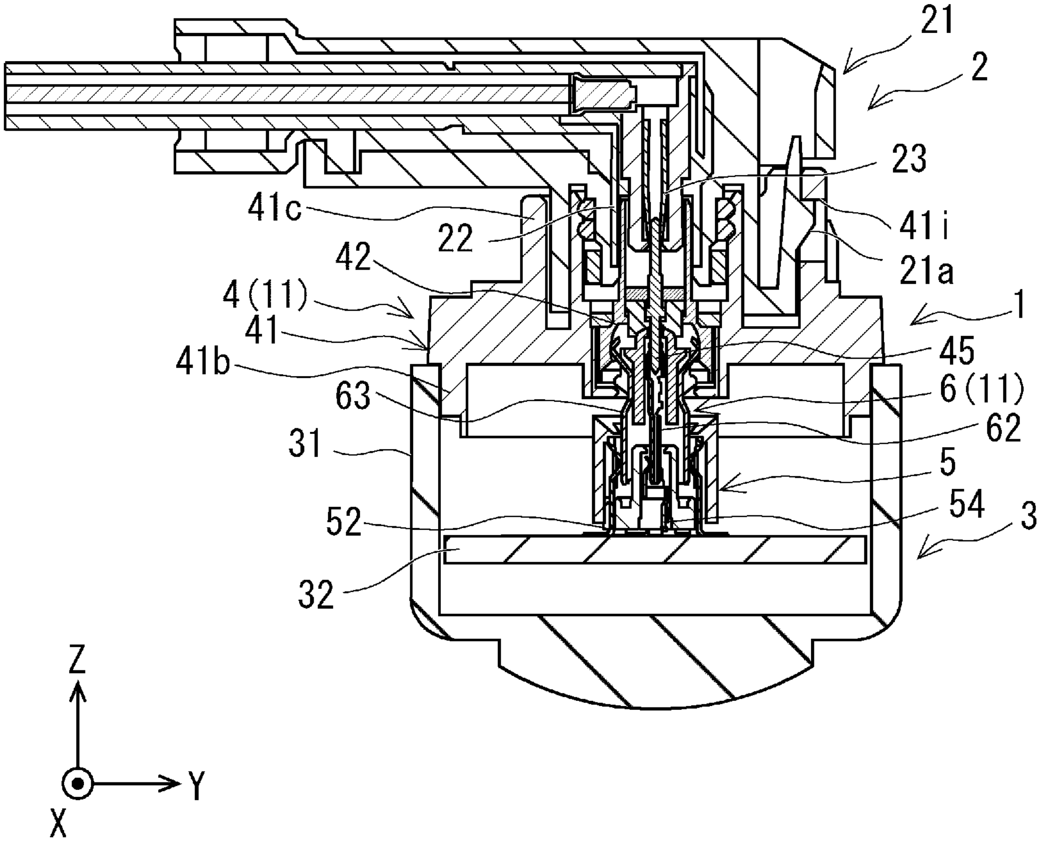
FIG. 1 is a cross-sectional view showing the state of use of a floating connector assembly according to an embodiment.

FIG. 1 is a cross-sectional view showing the state of use of a floating connector assembly according to this embodiment. As shown in FIG. 1, for example, a floating connector assembly 1 according to this embodiment can be used to electrically connect an output connector 2, which is a typical example of first equipment, and an imaging unit 3, which is a typical example of second equipment. Note that, however, the first equipment and the second equipment to be electrically connected by the floating connector assembly 1 are not particularly limited.

Figure 2:
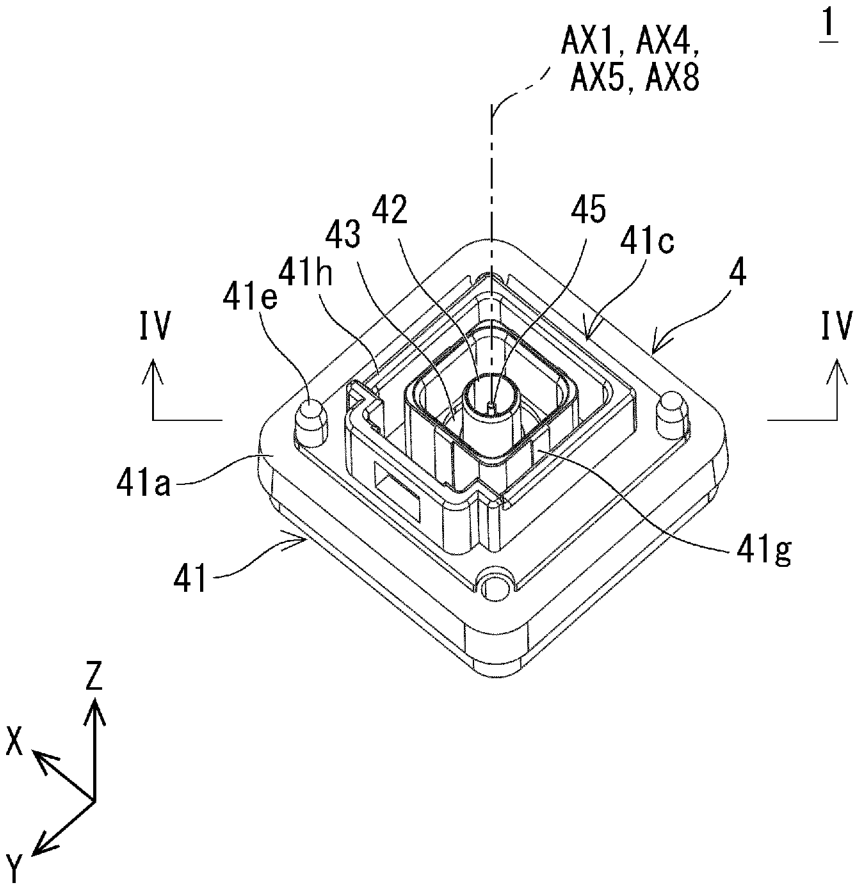
FIG. 2 is a perspective view of the floating connector assembly according to the embodiment when viewed from the positive side of the z axis.
Figure 3:
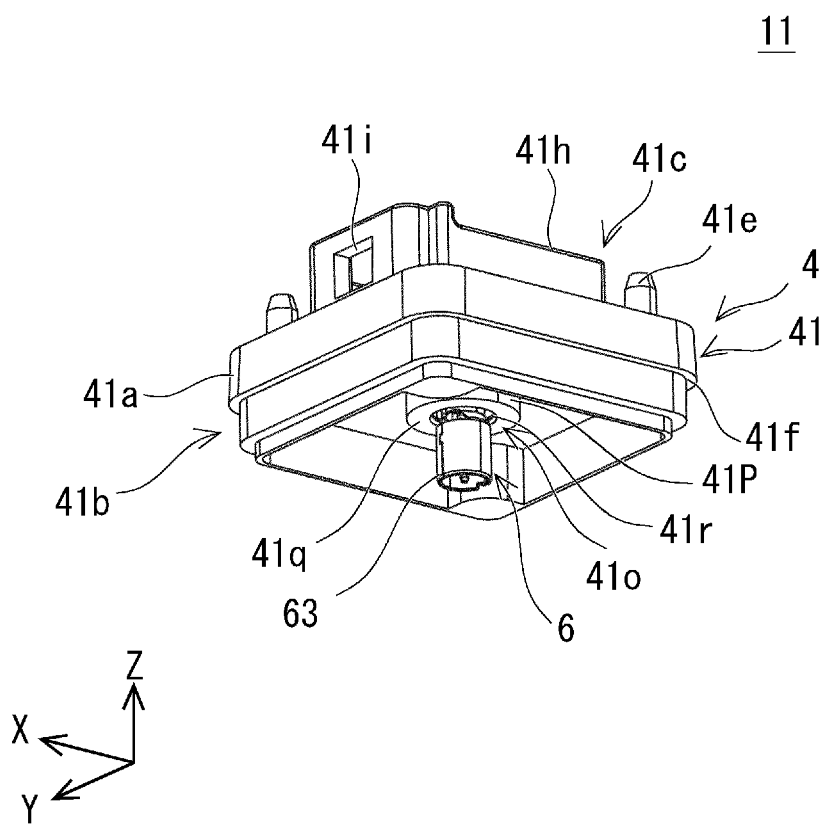
FIG. 3 is a perspective view of a floating connector according to the embodiment when viewed from the negative side of the z axis.
Figure 4:
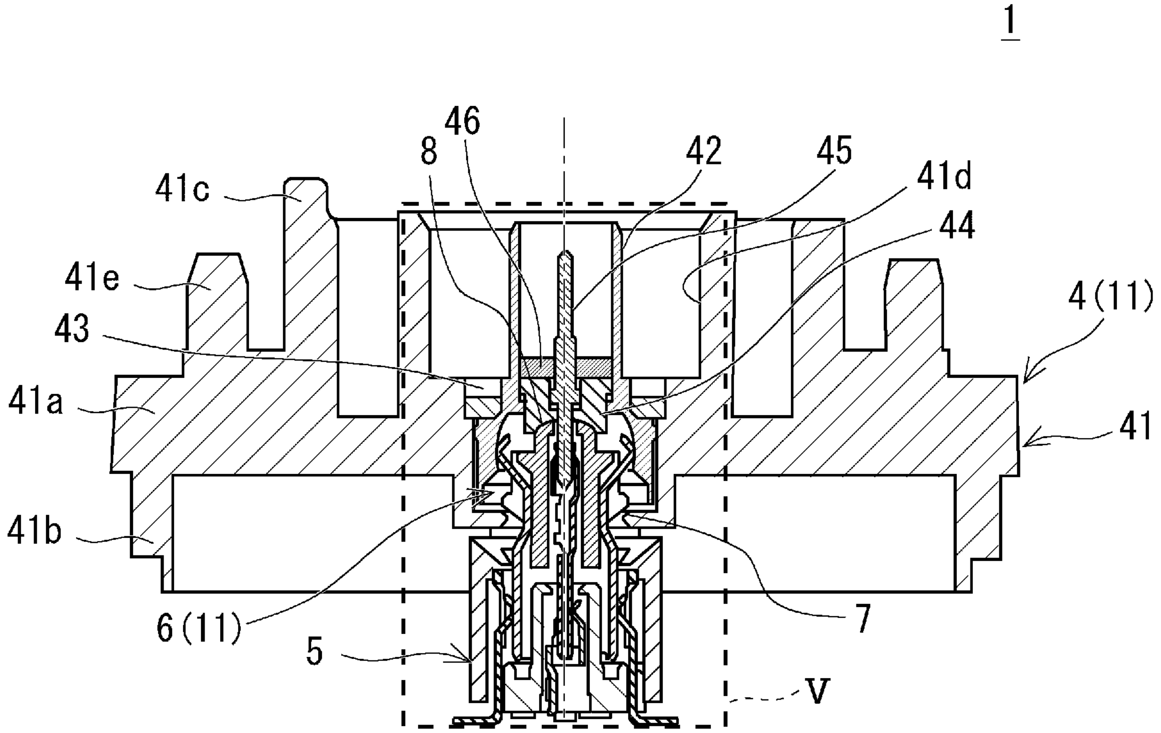
FIG. 4 is a cross-sectional view along line IV-IV in FIG. 2.
Figure 5:
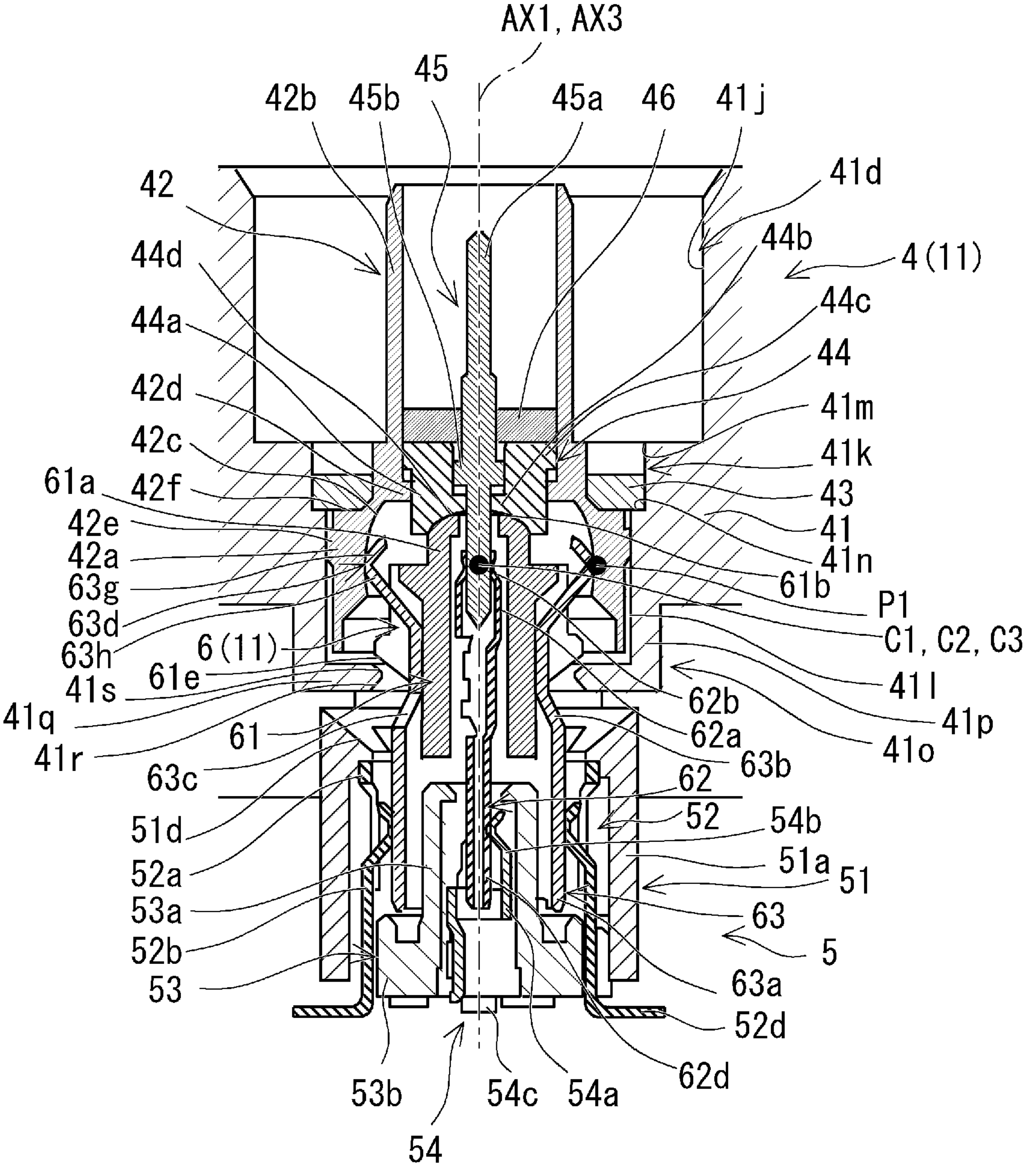
FIG. 5 is an enlarged view of a part V shown in FIG. 4.

FIG. 2 is a perspective view of the floating connector assembly according to the embodiment when viewed from the positive side of the z axis. FIG. 3 is a perspective view of a floating connector according to the embodiment when viewed from the negative side of the z axis. FIG. 4 is a cross-sectional view along line IV-IV in FIG. 2. FIG. 5 is an enlarged view of a part V shown in FIG. 4. As shown in FIGS. 2 to 5, the floating connector assembly 1 includes a first connector 4, a second connector 5, and a relay connector 6. The first connector 4 and the relay connector 6 constitute a floating connector 11.

Figure 6:
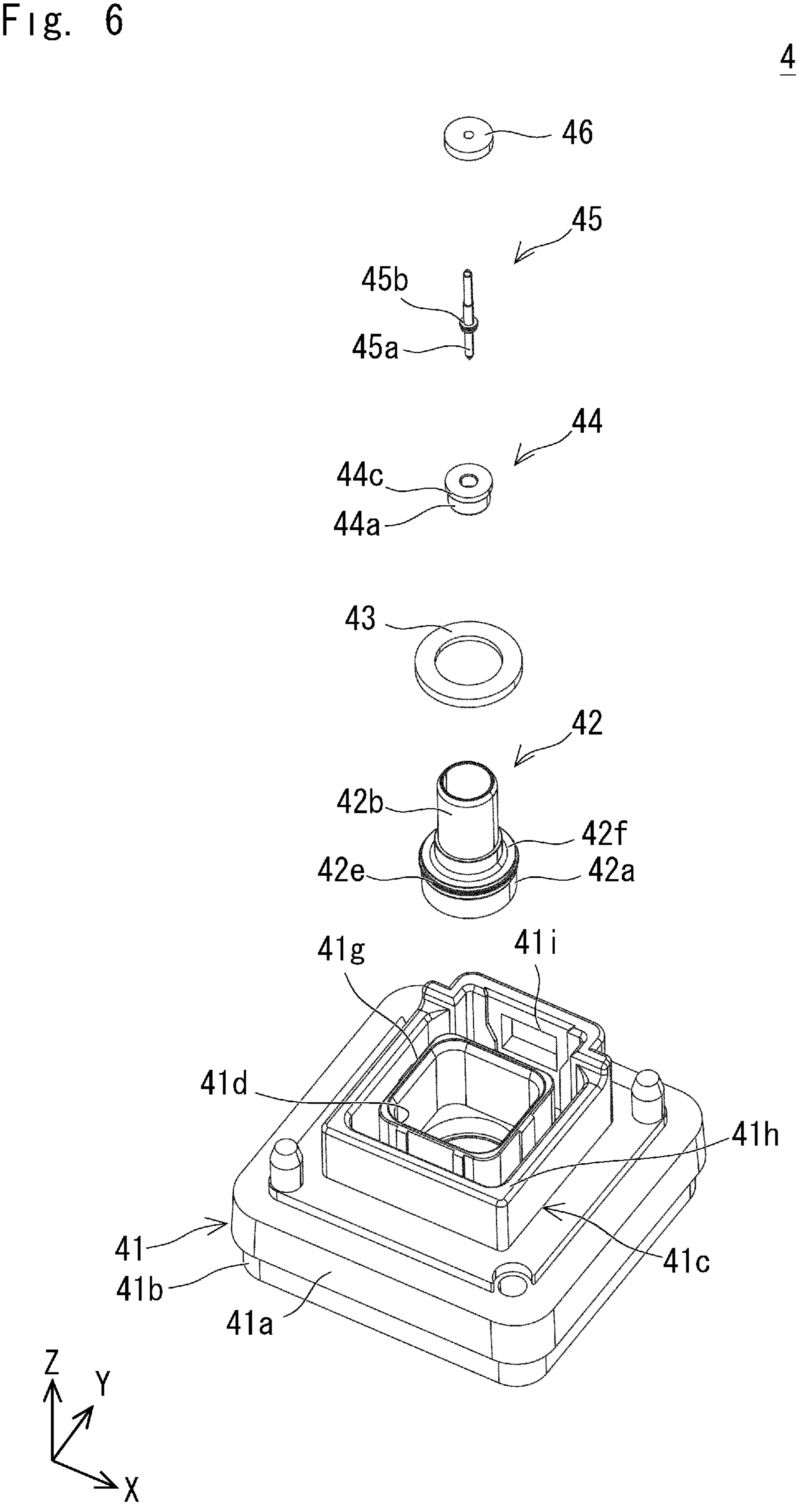
FIG. 6 is an exploded view of a first connector.

FIG. 6 is an exploded view of the first connector. As shown in FIG. 6, the first connector 4 includes a first housing 41, a ground terminal (second terminal) 42, a first potting 43, a second housing (retaining member) 44, a signal terminal 45, and a second potting 46.

Figure 7:
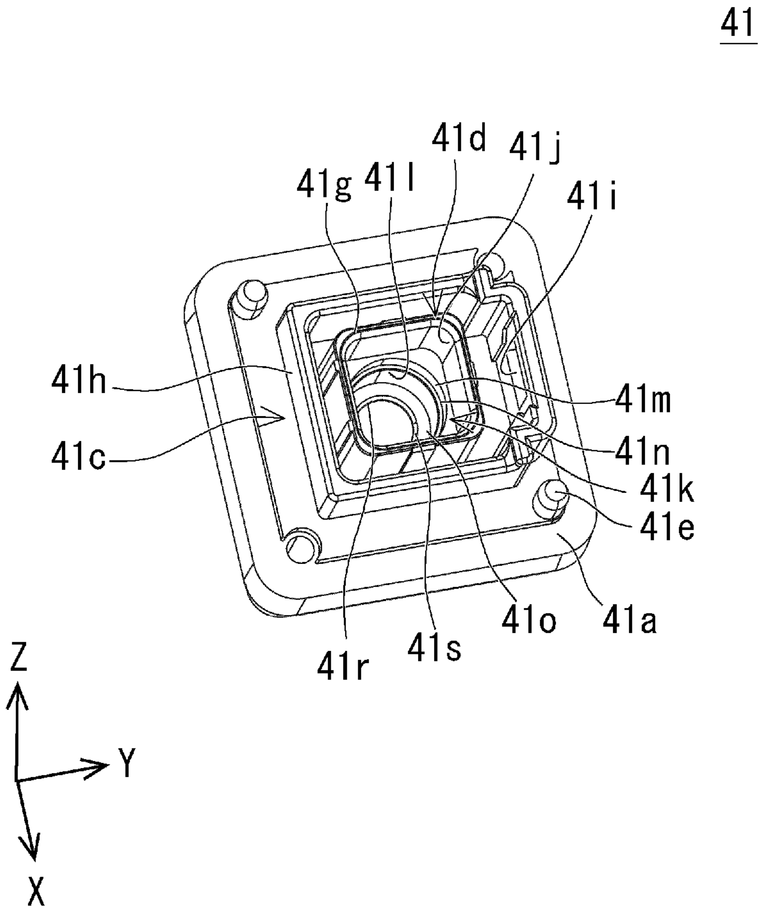
FIG. 7 is a perspective view of a first housing of the first connector when viewed from the positive side of the z axis.

FIG. 7 is a perspective view of the first housing of the first connector when viewed from the positive side of the z axis. The first housing 41 is an insulating resin molded object, for example. As shown in FIGS. 4 and 5, the first housing 41 holds a ground terminal 42 and a signal terminal 45. As shown in FIGS. 2 to 7, for example, the first housing 41 includes a base part 41*a*, a first insert-receiving part 41*b*, a second insert-receiving part 41*c*, and a penetration part 41*d*.

As shown in FIG. 7, the base part 41*a* has a plate shape substantially parallel to the xy-plane. The base part 41*a* has a substantially rectangular shape when viewed from the z axis direction, for example. A fixing part 41*e* for fixing a fixing jig or the like, which is not shown, is preferably formed in the base part 41*a*. The fixing part 41*e* projects on the positive side of the z axis from the base part 41*a*, and it is disposed at a corner of the base part 41*a*, for example. The fixing part 41*e* has a substantially cylindrical shape, for example.

As shown in FIG. 1, the first insert-receiving part 41*b* has a structure into which a part of the housing 31 on the positive side of the z axis in the imaging unit 3 can be inserted. As shown in FIG. 3, for example, the first insert-receiving part 41*b* has a tubular shape that projects on the negative side of the z axis from the base part 41*a* and is disposed along the edge of the base part 41*a*. A step part 41*f* is preferably formed at the boundary between the base part 41*a* and the first insert-receiving part 41*b*.

As shown in FIG. 1, the second insert-receiving part 41*c* has a structure into which a housing 21 of the output connector 2 can be inserted. As shown in FIG. 7, the second insert-receiving part 41*c* includes a first tubular part 41*g* and a second tubular part 41*h*.

As shown in FIG. 7, the first tubular part 41*g* projects on the positive side of the z axis from the base part 41*a*, and it is disposed substantially at the center of the base part 41*a* when viewed from the z axis direction. The first tubular part 41*g* has a substantially rectangular shape when viewed from the z axis direction, for example.

As shown in FIG. 7, the second tubular part 41*h* projects on the positive side of the z axis from the base part 41*a*, and it surrounds the first tubular part 41*g*. The second tubular part 41*h* is disposed substantially at the center of the base part 41*a* when viewed from the z axis direction, and it has a substantially convex shape that projects on the positive side of the y axis, for example.

At this time, an engaged part 41*i* with which an engagement part 21*a* of the housing 21 of the output connector 2 is engaged is preferably formed in a part of the second tubular part 41*h* on the positive side of the y axis, as shown in FIG. 1. As shown in FIG. 7, for example, the engaged part 41*i* is a penetrating hole that penetrates the part of the second tubular part 41*h* on the positive side of the y axis, and it has a substantially rectangular shape when viewed from the y axis direction, for example.

As shown in FIG. 7, the penetration part 41*d* penetrates the first housing 41 in the z axis direction. The penetration part 41*d* includes a first part 41*j* and a second part 41*k*. The first part 41*j* is an internal space of the first tubular part 41*g* of the second insert-receiving part 41*c*, and it has a substantially rectangular pillar shape, for example.

As shown in FIG. 5, the second part 41*k* penetrates the base part 41*a* in the z axis direction and is continuous with the first part 41*j*. The second part 41*k* is disposed on the negative side of the z axis relative to the first part 41*j*. As shown in FIG. 7, the second part 41*k* is disposed substantially at the center of the first part 41*j* when viewed from the z axis direction, and it has a substantially cylindrical shape, for example.

As shown in FIGS. 5 and 7, the second part 41*k* preferably includes a minor diameter part 41*l* and a major diameter part 41*m*. The edge of the minor diameter part 41*l* and the edge of the major diameter part 41*m* are arranged in a substantially concentric fashion when viewed from the z axis direction. The minor diameter part 41*l* is disposed on the negative side of the z axis relative to the major diameter part 41*m*. Specifically, a step part 41*n* is formed at the boundary between the minor diameter part 41*l* and the major diameter part 41*m*. Further, as shown in FIG. 7, the end of the second part 41*k* on the negative side of the z axis is preferably narrowed by a stopper part 410 formed at the end of the base part 41*a* on the negative side of the z axis. Although detailed functions of the stopper part 410 are described later, the stopper part 410 projects on the negative side of the z axis from the base part 41*a* as shown in FIG. 3, for example. The stopper part 410 includes a tubular part 41*p* and a circular part 41*q*.

As shown in FIG. 3, the tubular part 41*p* projects on the negative side of the z axis from the base part 41*a*. The tubular part 41*p* has a substantially cylindrical shape, for example, and an internal space of the tubular part 41*p* forms a part of the second part 41*k* of the penetration part 41*d* on the negative side of the z axis.

As shown in FIG. 3, the circular part 41*q* has a plate shape substantially parallel to the xy-plane, and it has a substantially circular ring shape when viewed from the z axis direction, for example. The outer edge of the circular part 41*q* is continuous with the end of the tubular part 41*p* on the negative side of the z axis.

Specifically, as shown in FIG. 7, a penetration part 41*r* of the circular part 41*q* forms a narrowed part at the end of the second part 41*k* on the negative side of the z axis in the penetration part 41*d*. The edge of the second part 41*k* of the penetration part 41*d* and the edge of the penetration part 41*r* of the circular part 41*q* in the stopper part 410 are arranged in a substantially concentric fashion when viewed from the z axis direction.

The diameter of the penetration part 41*r* of the circular part 41*q* is described later. Although detailed functions are described later, a spherical part 41*s* is preferably formed at a part on the positive side of the z axis around the penetration part 41*r* of the circular part 41*q* as shown in FIGS. 5 and 7.

The spherical part 41*s* has a concave shape on the negative side of the z axis. As shown in FIG. 5, a center C1 of the spherical part 41*s* is at substantially the same position as a center C2 of a spherical part 42*c* of the ground terminal 42, which is described later. The diameter of the spherical part 41*s* may be any diameter.

Figure 8:
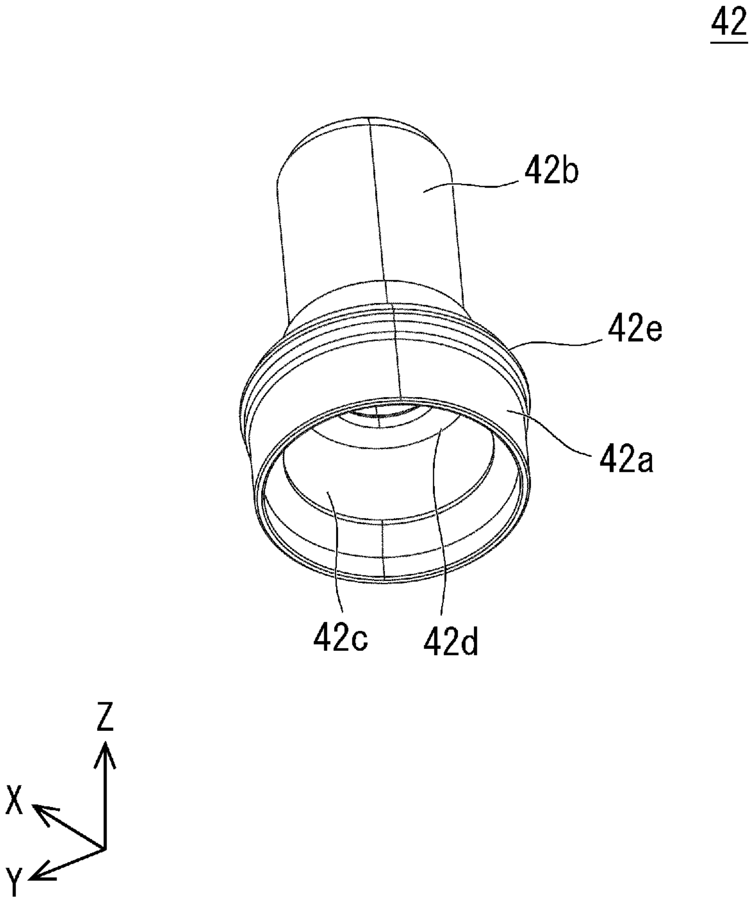
FIG. 8 is a perspective view of a ground terminal of the first connector when viewed from the negative side of the z axis.

FIG. 8 is a perspective view of the ground terminal of the first connector when viewed from the negative side of the z axis. The ground terminal 42 has electrical conductivity, and it is electrically connected to a ground terminal 22 of the output connector 2 as shown in FIG. 1. As shown in FIGS. 4 and 5, the ground terminal 42 is inserted into the penetration part 41*d* of the first housing 41.

As shown in FIGS. 6 and 8, the ground terminal 42 has a substantially cylindrical shape, for example, and includes a first part 42*a*, a second part 42*b*, a spherical part 42*c*, a first projecting part 42*d*, and a second projecting part 42*e*.

As shown in FIG. 5, the first part 42*a* is disposed in the minor diameter part 41*l* of the second part 41*k* of the penetration part 41*d* in the first housing 41. The outside diameter of the first part 42*a* is substantially equal to the diameter of the minor diameter part 41*l* of the second part 41*k* of the penetration part 41*d* in the first housing 41. The height in the z axis direction of the first part 42*a* is substantially equal to the height in the z axis direction of the minor diameter part 41*l* of the second part 41*k* of the penetration part 41*d* in the first housing 41.

As shown in FIG. 5, the second part 42*b* is disposed on the positive side of the z axis relative to the first part 42*a*, and it lies across the first part 41*j* of the penetration part 41*d* and the major diameter part 41*m* of the second part 41*k* in the first housing 41.

As shown in FIGS. 6 and 8, the outside diameter of the second part 42*b* is smaller than the outside diameter of the first part 42*a*. Thus, on the outer periphery of the ground terminal 42, a step part 42*f* is formed at the boundary between the first part 42*a* and the second part 42*b*.

As shown in FIG. 5, the height of the second part 42*b* in the z axis direction is substantially equal to the total height in the z axis direction of the first part 41*j* of the penetration part 41*d* and the major diameter part 41*m* of the second part 41*k* in the first housing 41.

As shown in FIGS. 5 and 8, the spherical part 42*c* is formed on the inner periphery of the ground terminal 42. The spherical part 42*c* is disposed on a part of the ground terminal 42 on the negative side of the z axis. The spherical part 42*c* has a concave shape to the outside of the ground terminal 42 in the radial direction.

As shown in FIG. 5, for example, a center C2 of the spherical part 42*c* is disposed on a center axis AX1 of the ground terminal 42 and substantially at the center of the height in the z axis direction of the first part 42*a* of the ground terminal 42. The diameter of the spherical part 42*c* may be any diameter.

As shown in FIGS. 5 and 8, the first projecting part 42*d* projects inward in the radial direction of the ground terminal 42 from the inner periphery of the ground terminal 42. The first projecting part 42*d* has a substantially circular ring shape when viewed from the z axis direction, for example. The first projecting part 42*d* is disposed at the end of the spherical part 42*c* on the positive side of the z axis.

As shown in FIGS. 6 and 8, the second projecting part 42*e* projects outward in the radial direction of the first part 42*a* from the outer periphery of the first part 42*a*. The second projecting part 42*e* has a substantially circular ring shape when viewed from the z axis direction, for example.

In the state where the ground terminal 42 is inserted into the penetration part 41*d* of the first housing 41, the second projecting part 42*e* is in strong contact with the periphery of the minor diameter part 41*l* of the second part 41*k* of the penetration part 41*d* in the first housing 41 as shown in FIG. 5, and thereby the ground terminal 42 is held by the first housing 41.

The first potting 43 is a waterproof sealing material, for example, and FIG. 6 shows its hardened state. In the state where the ground terminal 42 is inserted into the penetration part 41*d* of the first housing 41, the first potting 43 is applied around the step part 42*f* of the ground terminal 42 and hardened as shown in FIG. 5, which prevents water or the like from getting into the gap between the first part 42*a* of the ground terminal 42 and the penetration part 41*d* of the first housing 41.

Figure 9:
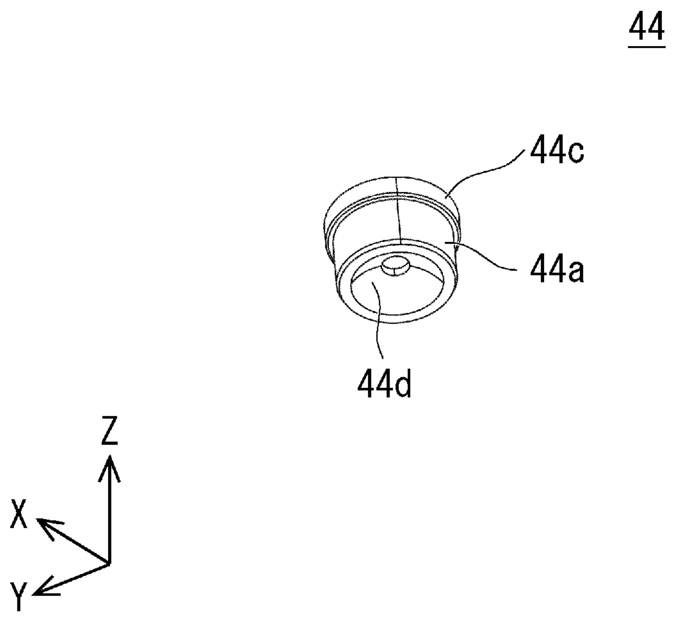
FIG. 9 is a perspective view of a second housing of the first connector when viewed from the negative side of the z axis.

FIG. 9 is a perspective view of the second housing of the first connector when viewed from the negative side of the z axis. The second housing 44 is an insulating resin molded object, for example, and it is inserted into the ground terminal 42 as shown in FIG. 5. The second housing 44 includes a tubular part 44*a*, a projecting part 44*b*, and a flange part 44*c*.

As shown in FIG. 5, the tubular part 44*a* lies across the first projecting part 42*d* of the ground terminal 42. As shown in FIGS. 5 and 9, for example, the tubular part 44*a* has a substantially cylindrical shape. As shown in FIG. 5, the outside diameter of the tubular part 44*a* is substantially equal to the diameter of the inside of the first projecting part 42*d* in the ground terminal 42.

As shown in FIG. 5, the projecting part 44*b* projects inward in the radial direction of the tubular part 44*a* from the inner periphery of the tubular part 44*a*. The projecting part 44*b* has a substantially circular ring shape when viewed from the z axis direction, for example. The projecting part 44*b* is substantially at the center of the height in the z axis direction of the tubular part 44*a*.

As shown in FIG. 5, the flange part 44*c* is disposed on the positive side of the z axis relative to the first projecting part 42*d* of the ground terminal 42. As shown in FIGS. 6 and 9, the flange part 44*c* projects outward in the radial direction of the tubular part 44*a* from the outer periphery of the tubular part 44*a*. The flange part 44*c* has a substantially circular ring shape when viewed from the z axis direction, for example. The flange part 44*c* is disposed at the end of the tubular part 44*a* on the positive side of the z axis.

As shown in FIG. 5, the outside diameter of the flange part 44*c* is substantially equal to the inside diameter of the second part 42*b* of the ground terminal 42. In the state where the second housing 44 is inserted into the ground terminal 42, the flange part 44*c* is in strong contact with the inner periphery of the second part 42*b* of the ground terminal 42, and thereby the second housing 44 is held by the ground terminal 42.

Although a detailed structure is described later, a spherical part 44*d* is preferably formed at the end of the second housing 44 on the negative side of the z axis as shown in FIG. 9. The spherical part 44*d* has a concave shape on the positive side of the z axis. As shown in FIG. 5, a center C3 of the spherical part 44*d* is disposed at substantially the same position as the center C2 of the spherical part 42*c* of the ground terminal 42. The diameter of the spherical part 44*d* may be any diameter.

The signal terminal 45 has electrical conductivity, and it is electrically connected to a signal terminal 23 of the output connector 2 as shown in FIG. 1. As shown in FIG. 5, the signal terminal 45 is inserted into the tubular part 44*a* of the second housing 44. The signal terminal 45 includes a pillar part 45*a* and a flange part 45*b*, for example.

As shown in FIG. 5, the pillar part 45*a* lies across the projecting part 44*b* of the second housing 44. As shown in FIG. 6, the pillar part 45*a* has a substantially cylindrical shape, for example. As shown in FIG. 5, the diameter of the pillar part 45*a* is substantially equal to the diameter of the inside of the projecting part 44*b* of the second housing 44.

In the state where the signal terminal 45 is inserted into the tubular part 44*a* of the second housing 44, the end of the pillar part 45*a* on the positive side of the z axis is disposed at substantially the same height as the end of the ground terminal 42 on the positive side of the z axis as shown in FIG. 5. Further, a part of the pillar part 45*a* on the negative side of the z axis projects on the negative side of the z axis from the second housing 44.

As shown in FIG. 5, the flange part 45*b* is disposed on the positive side of the z axis relative to the projecting part 44*b* of the second housing 44. As shown in FIG. 6, The flange part 45*b* projects outward in the radial direction of the pillar part 45*a* from the outer periphery of the pillar part 45*a*. The flange part 45*b* is disposed substantially at the center of the height in the z axis direction of the pillar part 45*a*.

As shown in FIG. 6, for example, the flange part 45*b* has a substantially circular ring shape when viewed from the z axis direction. As shown in FIG. 5, the outside diameter of the flange part 45*b* is substantially equal to the diameter of the inside of the tubular part 44*a* of the second housing 44. In the state where the signal terminal 45 is inserted into the tubular part 44*a* of the second housing 44, the flange part 45*b* is in strong contact with the inner periphery of the tubular part 44*a* of the second housing 44, and thereby the signal terminal 45 is held by the second housing 44.

The second potting 46 is a waterproof sealing material, for example, and FIG. 6 shows its hardened state. In the state where the signal terminal 45 is inserted into the tubular part 44*a* of the second housing 44, the second potting 46 is applied to the end of the second housing 44 on the positive side of the z axis and hardened as shown in FIG. 5, which prevents water or the like from getting into the gap between the ground terminal 42 and the second housing 44 and the gap between the signal terminal 45 and the second housing 44.

Figure 10:
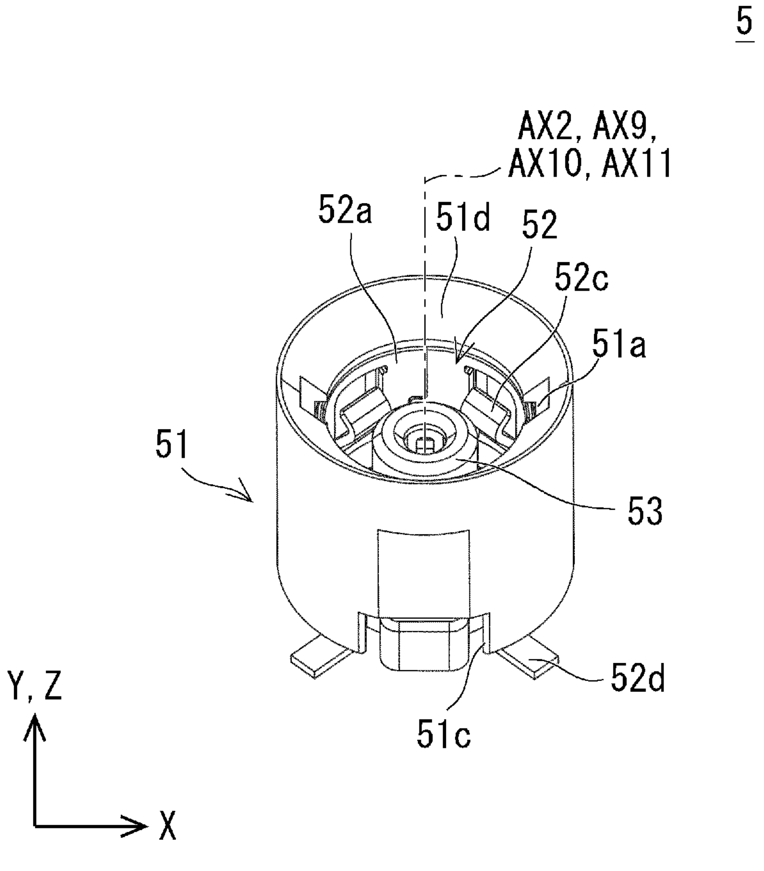
FIG. 10 is a perspective view of a second connector when viewed from the positive side of the z axis.
Figure 11:
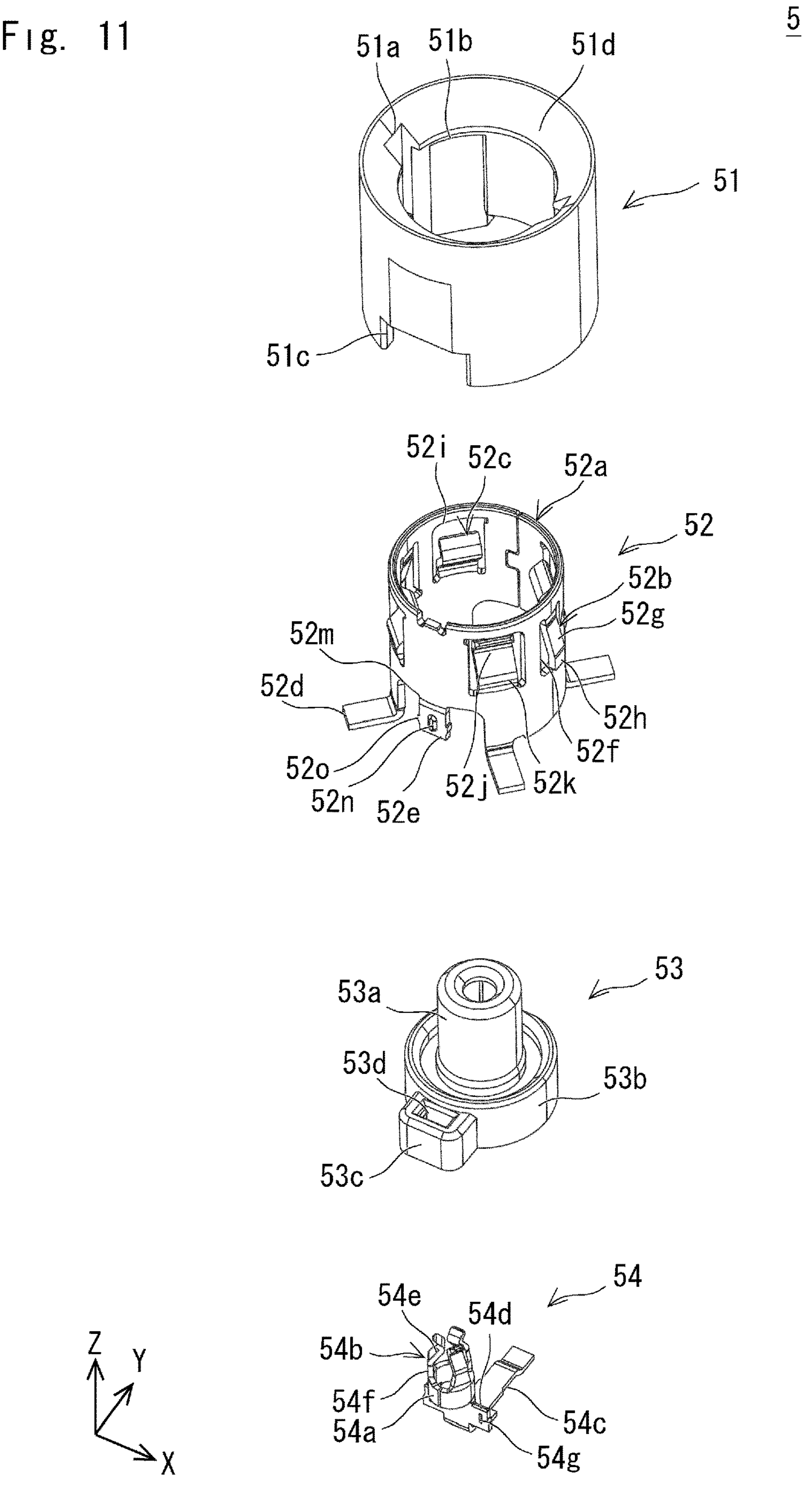
FIG. 11 is an exploded view of the second connector.
Figure 12:
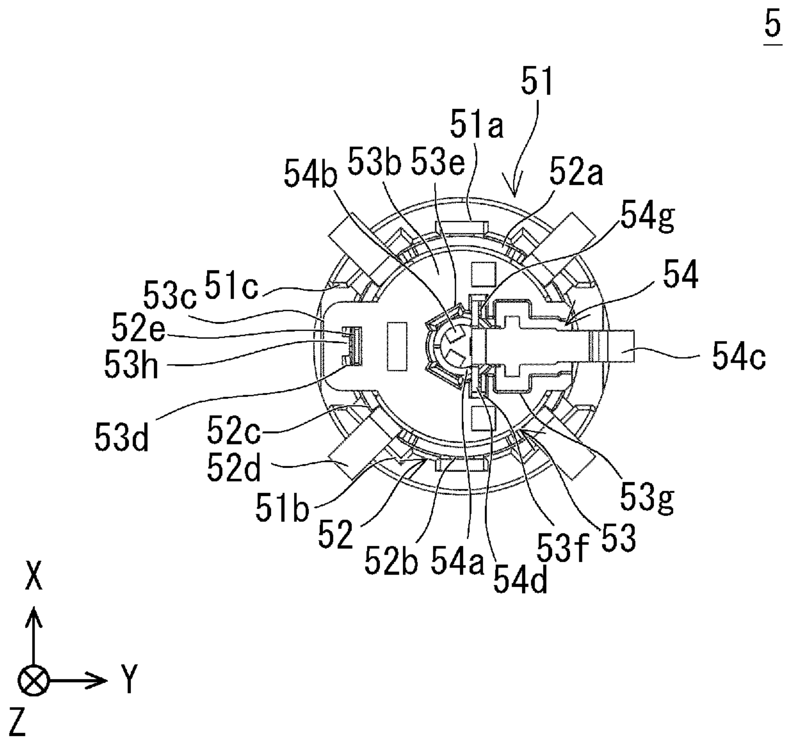
FIG. 12 is a view of the second connector when viewed from the negative side of the z axis.

FIG. 10 is a perspective view of the second connector when viewed from the positive side of the z axis. FIG. 11 is an exploded view of the second connector. FIG. 12 is a view of the second connector when viewed from the negative side of the z axis. As shown in FIGS. 10 and 11, the second connector 5 includes a first housing 51, a ground terminal 52, a second housing 53, and a signal terminal 54.

The first housing 51 is an insulating resin molded object, for example. As shown in FIGS. 10 and 11, the first housing 51 has a substantially cylindrical shape. The first housing 51 has a groove 51*a* on its inner periphery. As shown in FIG. 12, the groove 51*a* extends in the z axis direction, and disposed so as to be opposed in the x axis direction.

Further, as shown in FIG. 11, the first housing 51 has a hollow 51*b* on its inner periphery. The hollow 51*b* extends in the z axis direction, for example, and it has a substantially rectangular shape when viewed from a center axis AX2 of the first housing 51 to the outside in the radial direction of the first housing 51. As shown in FIG. 12, the hollows 51*b* are disposed at substantially equal intervals in the circumferential direction of the first housing 51.

As shown in FIGS. 11 and 12, the first housing 51 has a notch 51*c* that is open to the negative side of the z axis at its end on the negative side of the z axis. The notch 51*c* has a substantially rectangular shape when viewed from the y axis direction, for example, and the notches 51*c* are disposed so as to be opposed in the y axis direction.

As shown in FIGS. 10 and 11, at the end of the first housing 51 on the positive side of the z axis, an inclined surface 51*d* in a conical shape that is inclined to the negative side of the z axis toward the center axis AX2 side of the first housing 51 is formed.

The ground terminal 52 has electrical conductivity, and it is electrically connected to a board 32 of the imaging unit 3 as shown in FIG. 1. As shown in FIG. 10, the ground terminal 52 is inserted into the first housing 51. As shown in FIG. 11, the ground terminal 52 includes a tubular part 52*a*, a first contact spring part 52*b*, a second contact spring part 52*c*, a leg part 52*d*, and an insertion part 52*e*.

As shown in FIG. 5, the tubular part 52*a* is disposed inside the first housing 51. As shown in FIG. 11, for example, the tubular part 52*a* has a substantially cylindrical shape. The outside diameter of the tubular part 52*a* is substantially equal to the inside diameter of the first housing 51.

In the state where the ground terminal 52 is inserted into the first housing 51, the end of the tubular part 52*a* on the positive side of the z axis is disposed at substantially the same height as the end of the inclined surface 51*d* on the inside diameter side in the first housing 51 as shown in FIG. 10.

As shown in FIG. 12, the first contact spring part 52*b* is disposed inside the groove 51*a* of the tubular part 52*a*. As shown in FIG. 11, the first contact spring part 52*b* is disposed inside a first opening 52*f* in the tubular part 52*a*. The first contact spring part 52*b* has a plate shape, and the end of the first contact spring part 52*b* on the positive side of the z axis is connected to the end of the first opening 52*f* of the tubular part 52*a* on the positive side of the z axis.

As shown in FIG. 11, for example, the first contact spring part 52*b* has an inclined part 52*g* that is inclined outward in the radial direction of the tubular part 52*a* toward the negative side of the z axis, and a flat part 52*h* that extends to the negative side of the z axis from the inclined part 52*g*.

As shown in FIGS. 11 and 12, the first contact spring part 52*b* is disposed so as to be opposed in the x axis direction, and in the state where the ground terminal 52 is inserted into the first housing 51, the flat part 52*h* of the first contact spring part 52*b* is in contact with the bottom surface of the groove 51*a* of the first housing 51.

As shown in FIG. 12, the second contact spring part 52*c* is disposed so as to be opposed to the hollow 51*b* of the first housing 51. As shown in FIG. 11, the second contact spring part 52*c* is disposed inside a second opening 52*i* in the tubular part 52*a*. The second contact spring part 52*c* has a plate shape, and the end of the second contact spring part 52*c* on the negative side of the z axis is connected to the end of the second opening 52*i* of the tubular part 52*a* on the negative side of the z axis.

As shown in FIG. 11, the second contact spring part 52*c* has a corrugated shape when viewed from the circumferential direction of the tubular part 52*a*. Specifically, the second contact spring part 52*c* includes a first curve part 52*j* that projects inward in the radial direction of the tubular part 52*a* and a second curve part 52*k* that is disposed on the negative side of the z axis relative to the first curve part 52*j* and projects outward in the radial direction of the tubular part 52*a*.

As shown in FIGS. 11 and 12, the second contact spring parts 52*c* are disposed at substantially equal intervals in the circumferential direction of the tubular part 52*a*, and in the state where the ground terminal 52 is inserted into the first housing 51, the second curve part 52*k* of the second contact spring parts 52*c* is in contact with the bottom surface of the hollow 51*b* of the first housing 51.

In this manner, the first contact spring part 52*b* and the second contact spring parts 52*c* come into contact with the inner periphery of the first housing 51, and thereby the ground terminal 52 is held by the first housing 51. Note that the first contact spring part 52*b* and the second contact spring parts 52*c* can be formed by cutting out and bending the tubular part 52*a*.

As shown in FIG. 5, the leg part 52*d* is disposed on the negative side of the z axis relative to the first housing 51. As shown in FIG. 11, the leg part 52*d* projects outward in the radial direction of the tubular part 52*a* from the end of the tubular part 52*a* on the negative side of the z axis.

As shown in FIG. 11, the leg parts 52*d* are disposed at substantially equal intervals in the circumferential direction of the tubular part 52*a*. In the state where the ground terminal 52 is inserted into the first housing 51, the leg part 52*d* is drawn from the outer periphery of the first housing 51 as shown in FIG. 12.

As shown in FIG. 11, the insertion part 52*e* is disposed inside a notch 52*m* formed at the end of the tubular part 52*a* on the negative side of the z axis. The insertion part 52*e* has a plate shape, and the end of the insertion part 52*e* on the positive side of the z axis is connected to the end of the notch 52*m* of the tubular part 52*a* on the positive side of the z axis. The insertion part 52*e* has a substantially rectangular shape when viewed from the y axis direction, for example.

As shown in FIG. 11, the insertion part 52*e* preferably has a first projecting part 52*n* that projects outward in the radial direction of the tubular part 52*a* from the insertion part 52*e*. Further, the insertion part 52*e* preferably has a second projecting part 520 that projects in the circumferential direction of the tubular part 52*a* from the insertion part 52*e*.

The second housing 53 is an insulating resin molded object, for example. As shown in FIGS. 10 and 12, the second housing 53 is inserted into the tubular part 52*a* of the ground terminal 52. As shown in FIG. 11, the second housing 53 includes a tubular part 53*a*, a flange part 53*b*, a projecting part 53*c*, and an insert-receiving part 53*d*.

As shown in FIG. 10, the tubular part 53*a* is disposed inside the tubular part 52*a* of the ground terminal 52. As shown in FIG. 11, for example, the tubular part 53*a* has a substantially cylindrical shape. As shown in FIG. 12, grooves 53*e* may be disposed at substantially equal intervals in the circumferential direction of the tubular part 53*a*.

In the state where the second housing 53 is inserted into the tubular part 52*a* of the ground terminal 52, the end of the tubular part 53*a* on the positive side of the z axis is disposed at a lower position than the end of the ground terminal 52 on the positive side of the z axis as shown in FIG. 5.

As shown in FIG. 5, the flange part 53*b* is disposed inside the tubular part 52*a* of the ground terminal 52. As shown in FIG. 11, the flange part 53*b* projects outward in the radial direction of the tubular part 53*a* from the outer periphery of the tubular part 53*a*. The flange part 53*b* has a substantially circular ring shape when viewed from the z axis direction, for example. The flange part 53*b* is disposed at the end of the tubular part 53*a* on the negative side of the z axis.

As shown in FIG. 12, at the end of the tubular part 53*a* and the flange part 53*b* on the negative side of the z axis, an insert-receiving part 53*f* is preferably formed to be continuous with the inside of the tubular part 53*a*. The insert-receiving part 53*f* extends in the x axis direction so as to lie across the inside of the tubular part 53*a*. The insert-receiving part 53*f* has a substantially rectangular shape when viewed from the z axis direction, for example, and the insert-receiving part 53*f* is open to the negative side of the z axis.

Further, as shown in FIG. 12, a hollow 53*g* is preferably formed at the end of the tubular part 53*a* and the flange part 53*b* on the negative side of the z axis. The hollow 53*g* extends on the positive side of the y axis from the inside of the tubular part 53*a*. The hollow 53*g* has a substantially convex shape that projects on the positive side of the y axis when viewed from the z axis direction, for example, and the hollow 53*g* is open to the negative side of the z axis.

As shown in FIGS. 10 and 12, the projecting part 53*c* passes through the notch 51*c* on the negative side of the y axis of the first housing 51. As shown in FIG. 11, the projecting part 53*c* projects outward in the radial direction of the flange part 53*b* from the outer periphery of the flange part 53*b*. The projecting part 53*c* is disposed at the end of the tubular part 53*a* on the negative side of the z axis and opposed in the y axis direction.

As shown in FIGS. 11 and 12, the insert-receiving part 53*d* is a penetration part that is formed in the projecting part 53*c* on the negative side of the y axis. The insert-receiving part 53*d* extends in the z axis direction. As shown in FIG. 12, the insert-receiving part 53*d* preferably has a projecting part 53*h* that projects from the inner periphery of the insert-receiving part 53*d*. In the state where the second housing 53 is inserted into the ground terminal 52, the insertion part 52*e* of the ground terminal 52 is inserted into the insert-receiving part 53*d*.

In this state, the projecting part 53*h* of the insert-receiving part 53*d* of the second housing 53 presses the insertion part 52*e* on the positive side of the y axis through the first projecting part 52*n* of the ground terminal 52, and the insertion part 52*e* of the ground terminal 52 is interposed between the projecting part 53*h* of the insert-receiving part 53*d* of the second housing 53 and the end of the inner periphery of the insert-receiving part 53*d* on the positive side of the y axis.

Further, the second projecting part 520 of the insertion part 52*e* in the ground terminal 52 is in strong contact with the inner periphery of the insert-receiving part 53*d* of the second housing 53. The second housing 53 is thereby held by the ground terminal 52.

The signal terminal 54 has electrical conductivity, and it is inserted into the tubular part 53*a* of the second housing 53 as shown in FIG. 12. As shown in FIG. 11, the signal terminal 54 includes a tubular part 54*a*, a contact spring part 54*b*, a leg part 54*c*, and an insertion part 54*d*.

As shown in FIG. 5, the tubular part 54*a* is disposed inside the tubular part 53*a* of the second housing 53. The tubular part 54*a* has a substantially cylindrical shape, for example. The contact spring part 54*b* is disposed inside the tubular part 53*a* of the second housing 53. As shown in FIG. 11, the contact spring parts 54*b* are disposed at substantially equal intervals in the circumferential direction of the tubular part 54*a* when viewed from the z axis direction.

As shown in FIG. 11, the contact spring part 54*b* has a plate shape, and it includes a curve part 54*e* that projects inward in the radial direction of the tubular part 54*a*, for example, and a connection part 54*f* that extends on the negative side of the z axis from the curve part 54*e*. The end of the connection part 54*f* on the negative side of the z axis is connected to the end of the tubular part 54*a* on the positive side of the z axis. Thus, the contact spring part 54*b* projects on the positive side of the z axis from the tubular part 54*a*.

As shown in FIG. 12, the leg part 54*c* is drawn from the inside of the tubular part 53*a* of the second housing 53 to the outside of the first housing 51 through the hollow 53*g* and the notch 51*c* of the first housing 51 on the positive side of the y axis. As shown in FIG. 11, for example, the leg part 54*c* is substantially L-shaped when viewed from the x axis direction, and the end of the leg part 54*c* on the positive side of the z axis is connected to the end of the tubular part 54*a* on the negative side of the z axis.

As shown in FIG. 12, the insertion part 54*d* is inserted into the insert-receiving part 53*f* of the second housing 53. As shown in FIG. 11, the insertion part 54*d* projects on the positive side and on the negative side of the x axis from the leg part 54*c*. The insertion part 54*d* has a substantially rectangular shape when viewed from the y axis direction, for example. The insertion part 54*d* is disposed substantially at the center of the height in the z axis direction of the part of the leg part 54*c* extending in the z axis direction.

As shown in FIG. 12, the insertion part 54*d* preferably has a projecting part 54*g* that projects on the positive side of the y axis from the insertion part 54*d*. In the state where the signal terminal 54 is inserted into the tubular part 53*a* of the second housing 53, the insertion part 54*d* is in strong contact with the periphery of the insert-receiving part 53*f* of the second housing 53 with the projecting part 54*g* of the insertion part 54*d* interposed therebetween, and thereby the signal terminal 54 is held by the second housing 53.

Figure 13:
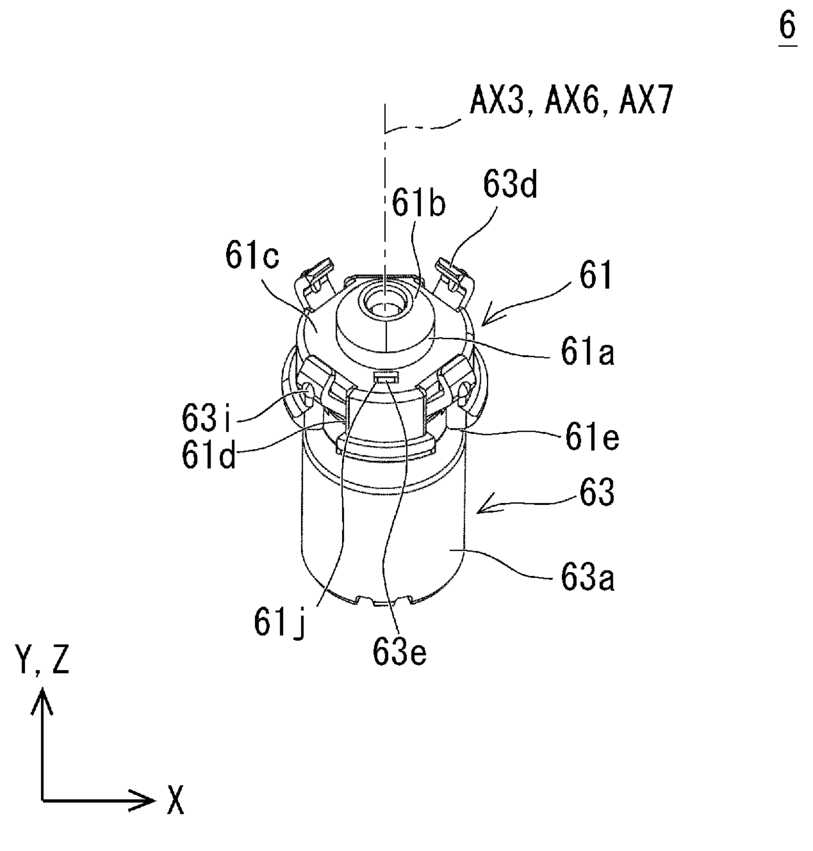
FIG. 13 is a perspective view of a relay connector when viewed from the positive side of the z axis.
Figure 14:
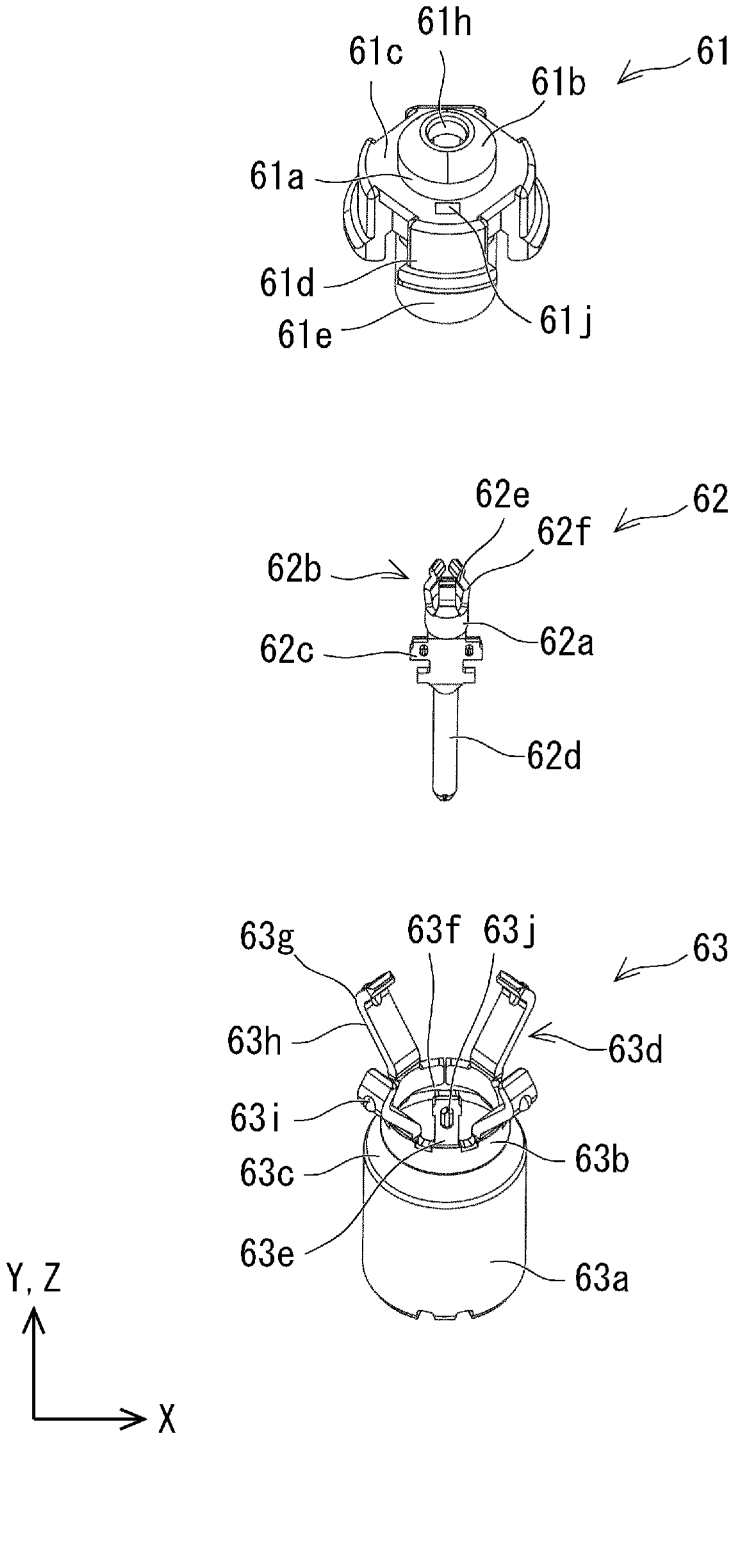
FIG. 14 is an exploded view of the relay connector.
Figure 15:
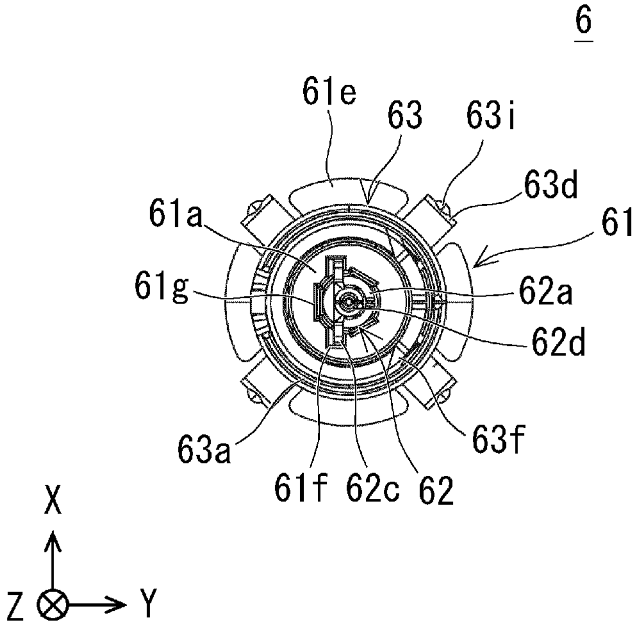
FIG. 15 is a view of the relay connector when viewed from the negative side of the z axis.

FIG. 13 is a perspective view of a relay connector when viewed from the positive side of the z axis. FIG. 14 is an exploded view of the relay connector. FIG. 15 is a perspective view of the relay connector when viewed from the negative side of the z axis. As shown in FIG. 5, the relay connector 6 electrically connects the first connector 4 and the second connector 5. As shown in FIGS. 13 to 15, the relay connector 6 includes a housing (holding member) 61, a signal terminal 62, and a ground terminal (first terminal) 63.

Figure 16:
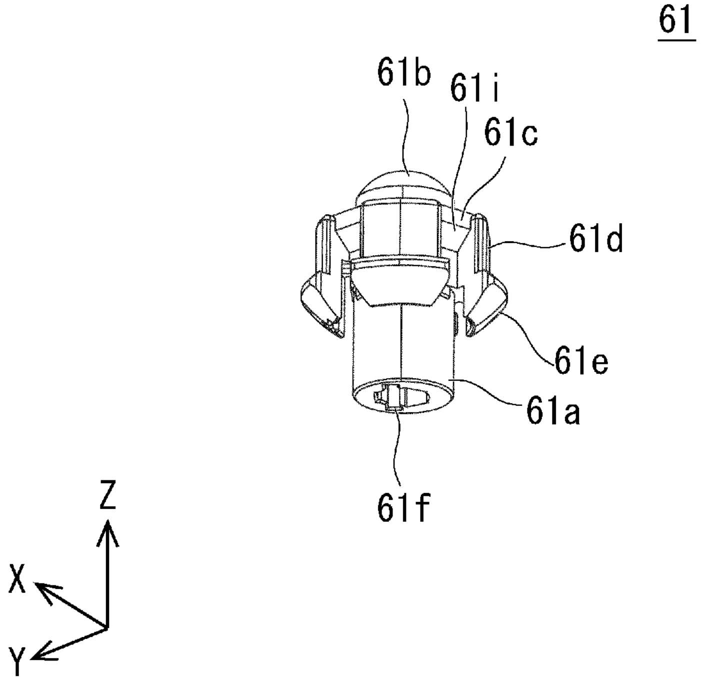
FIG. 16 is a perspective view of a housing of the relay connector when viewed from the negative side of the z axis.

FIG. 16 is a perspective view of the housing of the relay connector when viewed from the negative side of the z axis. The housing 61 is an insulating resin molded object, for example. As shown in FIGS. 14 and 16, the housing 61 includes a tubular part 61*a*, a first spherical part 61*b*, a flange part 61*c*, a wall part 61*d*, and a second spherical part 61*e*.

As shown in FIG. 16, for example, the tubular part 61*a* has a substantially cylindrical shape. At the end of the tubular part 61*a* on the negative side of the z axis, an insert-receiving part 61*f* is formed to be continuous with the inside of the tubular part 61*a*. The insert-receiving part 61*f* extends in the x axis direction so as to lie across the inside of the tubular part 61*a*.

As shown in FIG. 16, for example, the insert-receiving part 61*f* has a substantially rectangular shape when viewed from the z axis direction, and the insert-receiving part 61*f* is open to the negative side of the z axis. Note that, on the inner periphery of the tubular part 61*a*, grooves 61*g* may be formed at substantially equal intervals in the circumferential direction of the tubular part 61*a* as shown in FIG. 15.

As shown in FIG. 14, the first spherical part 61*b* is formed at the end of the tubular part 61*a* on the positive side of the z axis, and a penetration part 61*h* is formed at substantially the center of the first spherical part 61*b* when viewed from the z axis direction. The penetration part 61*h* is continuous with the inside of the tubular part 61*a*, and it has a substantially cylindrical shape, for example.

The outside diameter (inside diameter) of the tubular part 61*a* and the edge of the penetration part 61*h* are arranged in a substantially concentric fashion when viewed from the z axis direction. As shown in FIG. 14, the first spherical part 61*b* is convex on the positive side of the z axis. The diameter of the first spherical part 61*b* is substantially equal to the diameter of the spherical part 44*d* of the second housing 44 in the first connector 4.

As shown in FIG. 14, the flange part 61*c* projects outward in the radial direction of the tubular part 61*a* from the outer periphery of the tubular part 61*a*. The flange part 61*c* has a substantially rectangular shape when viewed from the z axis direction, for example, and each edge of the flange part 61*c* curves along the inner peripheral shape of the first part 42*a* of the ground terminal 42 in the first connector 4.

A circle that is formed by connecting the rim of the flange part 61*c* and the edge of the penetration part 61*h* of the first spherical part 61*b* are arranged in a substantially concentric fashion when viewed from the z axis direction. The flange part 61*c* is disposed in the part of the tubular part 61*a* on the positive side of the z axis.

As shown in FIG. 16, at the end of the flange part 61*c* on the negative side of the z axis, an inclined surface 61*i* that is inclined outward in the radial direction of the tubular part 61*a* toward the positive side of the z axis is formed. The inclined surface 61*i* is disposed between the edges of the flange part 61*c*.

As shown in FIG. 14, an insert-receiving part 61*j* is formed in the flange part 61*c*. The insert-receiving part 61*j* penetrates the flange part 61*c* in the z axis direction, and it has a substantially rectangular pillar shape when viewed from the z axis direction, for example.

As shown in FIGS. 14 and 16, the wall part 61*d* extends on the negative side of the z axis from each edge of the flange part 61*c* and also projects outward in the radial direction of the tubular part 61*a* from the outer periphery of the tubular part 61*a*. The side surface of the wall part 61*d* curves to be continuous with each edge of the flange part 61*c* when viewed in the z axis direction.

As shown in FIG. 16, the second spherical part 61*e* is formed at the end of the wall part 61*d* on the negative side of the z axis. The second spherical part 61*e* is convex on the negative side of the z axis. The diameter of the second spherical part 61*e* is substantially equal to the diameter of the spherical part 41*s* of the first housing 41 in the first connector 4.

The signal terminal 62 has electrical conductivity, and it is inserted into the tubular part 61*a* of the housing 61 as shown in FIG. 5. As shown in FIG. 14, the signal terminal 62 includes a tubular part 62*a*, a contact spring part 62*b*, an insertion part 62*c*, and a pillar part 62*d*. As shown in FIG. 5, the tubular part 62*a* is disposed inside the tubular part 61*a* of the housing 61. The tubular part 62*a* has a substantially cylindrical shape, for example.

As shown in FIG. 5, the contact spring part 62*b* is disposed inside the tubular part 61*a* of the housing 61. As shown in FIG. 14, the contact spring parts 62*b* are disposed at substantially equal intervals in the circumferential direction of the tubular part 62*a* when viewed from the z axis direction. The contact spring part 62*b* has a plate shape, and the end of the contact spring part 62*b* on the negative side of the z axis is connected to the end of the tubular part 61*a* on the positive side of the z axis.

As shown in FIG. 14, for example, the contact spring part 62*b* has a corrugated shape when viewed from the circumferential direction of the tubular part 62*a*. Specifically, the contact spring part 62*b* includes a first curve part 62*e* that projects inward in the radial direction of the tubular part 62*a* and a second curve part 62*f* that is disposed on the negative side of the z axis relative to the first curve part 62*e* and projects outward in the radial direction of the tubular part 62*a*.

As shown in FIG. 15, the insertion part 62*c* is inserted into the insert-receiving part 61*f* of the housing 61. As shown in FIG. 14, for example, the insertion part 62*c* has a substantially lying H shape when viewed from the y axis direction, and the end of the insertion part 62*c* on the positive side of the z axis is connected to the end of the tubular part 62*a* on the negative side of the z axis. The insertion part 62*c* is disposed on the negative side of the y axis of the tubular part 62*a*.

In the state where the insertion part 62*c* is inserted into the insert-receiving part 61*f* of the housing 61, the insertion part 62*c* is in strong contact with the periphery of the insert-receiving part 61*f* of the housing 61, and thereby the signal terminal 62 is held by the housing 61.

As shown in FIG. 5, the pillar part 62*d* projects on the negative side of the z axis from the housing 61. The pillar part 62*d* has a substantially cylindrical shape, for example, and the end of the pillar part 62*d* on the negative side of the z axis is narrowed as shown in FIG. 14.

As shown in FIG. 14, the pillar part 62*d* extends on the negative side of the z axis from the insertion part 62*c*. The pillar part 62*d* is disposed substantially at the center of the width in the x axis direction of the insertion part 62*c*. The outer periphery (inner periphery) of the pillar part 62*d* and the outer periphery (inner periphery) of the tubular part 62*a* are arranged in a substantially concentric fashion when viewed from the z axis direction.

The ground terminal 63 has electrical conductivity, and it surrounds the housing 61 as shown in FIG. 13. As shown in FIG. 14, the ground terminal 63 includes a first tubular part 63*a*, a second tubular part 63*b*, a connection part 63*c*, a contact spring part 63*d*, and an insertion part 63*e*. The first tubular part 63*a* has a substantially cylindrical shape, for example.

The second tubular part 63*b* is disposed on the positive side of the z axis relative to the first tubular part 63*a*, and it has a substantially cylindrical shape, for example. The outside diameter of the second tubular part 63*b* is smaller than the outside diameter of the first tubular part 63*a* as shown in FIG. 14.

As shown in FIG. 5, the inside diameter of the second tubular part 63*b* is smaller than the inside diameter of the first tubular part 63*a* as shown in FIG. 5. The outer periphery (inner periphery) of the first tubular part 63*a* and the outer periphery (inner periphery) of the second tubular part 63*b* are arranged in a substantially concentric fashion when viewed from the z axis direction.

As shown in FIG. 14, the connection part 63*c* connects the first tubular part 63*a* and the second tubular part 63*b*. The connection part 63*c* has a substantially conical shape that tapers inward in the radial direction of the connection part 63*c* toward the positive side of the z axis. The connection part 63*c* may have an opening 63*f*.

As shown in FIG. 13, the contact spring part 63*d* covers the inclined surface 61*i* of the housing 61, and is disposed on the positive side of the z axis relative to the second spherical part 61*e* of the housing 61. As shown in FIG. 14, the contact spring parts 63*d* are disposed at substantially equal intervals in the circumferential direction of the second tubular part 63*b* when viewed in the z axis direction. The contact spring part 63*d* has a plate shape, and the end of the contact spring part 63*d* on the negative side of the z axis is connected to the end of the second tubular part 63*b* on the positive side of the z axis.

As shown in FIG. 14, for example, the contact spring part 63*d* curves to project outward in the radial direction of the second tubular part 63*b* when viewed in the circumferential direction of the second tubular part 63*b*. Specifically, the contact spring part 63*d* includes a curve part 63*g* that curves outward in the radial direction of the second tubular part 63*b*, and a connection part (inclined part) 63*h* that connects the curve part 63*g* and the second tubular part 63*b* and it is inclined outward in the radial direction of the second tubular part 63*b* toward the positive side of the z axis. The connection part 63*h* is inclined along the inclined surface 61*i* of the housing 61.

The curvature of the lateral surface (i.e., the surface of the second tubular part 63*b* on the outer side in the radial direction) of the curve part 63*g* of the contact spring part 63*d* is preferably greater than the curvature of the spherical part 42*c* of the ground terminal 42 of the first connector 4 as shown in FIG. 5. Further, the lateral surface of the curve part 63*g* of the contact spring part 63*d* preferably has a contact point 63*i* that projects outward in the radial direction of the second tubular part 63*b* from the lateral surface of the curve part 63*g*, as shown in FIG. 14. A projecting surface of the contact point 63*i* is spherical, and the curvature of the projecting surface of the contact point 63*i* is greater than the curvature of the spherical part 42*c* of the ground terminal 42 of the first connector 4.

Furthermore, as shown in FIG. 5, the distance between the external end in the radial direction of the second tubular part 63*b* in the contact point 63*i* and a center line AX3 of the ground terminal 63 (i.e., the distance in the direction orthogonal to the center line AX3) is preferably slightly larger than the radius of the spherical part 42*c* of the ground terminal 42 of the first connector 4.

As shown in FIG. 13, the insertion part 63*e* is inserted into the insert-receiving part 61*j* of the housing 61. As shown in FIG. 14, the insertion part 63*e* projects on the positive side of the z axis from the second tubular part 63*b*. The insertion part 63*e* is disposed on the negative side of the y axis of the second tubular part 63*b*.

As shown in FIG. 14, the insertion part 63*e* has a plate shape, and it has a substantially rectangular shape when viewed from the y axis direction, for example. The insertion part 63*e* preferably has a projecting part 63*j* that projects on the negative side of the y axis from the insertion part 63*e*.

In the state where the insertion part 63*e* is inserted into the insert-receiving part 61*j* of the housing 61, the insertion part 63*e* is in strong contact with the periphery of the insert-receiving part 61*j* of the housing 61 with the projecting part 63*j* of the insertion part 63*e* interposed therebetween, and thereby the ground terminal 63 is held by the housing 61. The end of the ground terminal 63 on the negative side of the z axis is disposed at substantially the same height as the end of the signal terminal 62 on the negative side of the z axis as shown in FIG. 5.

Figure 17:
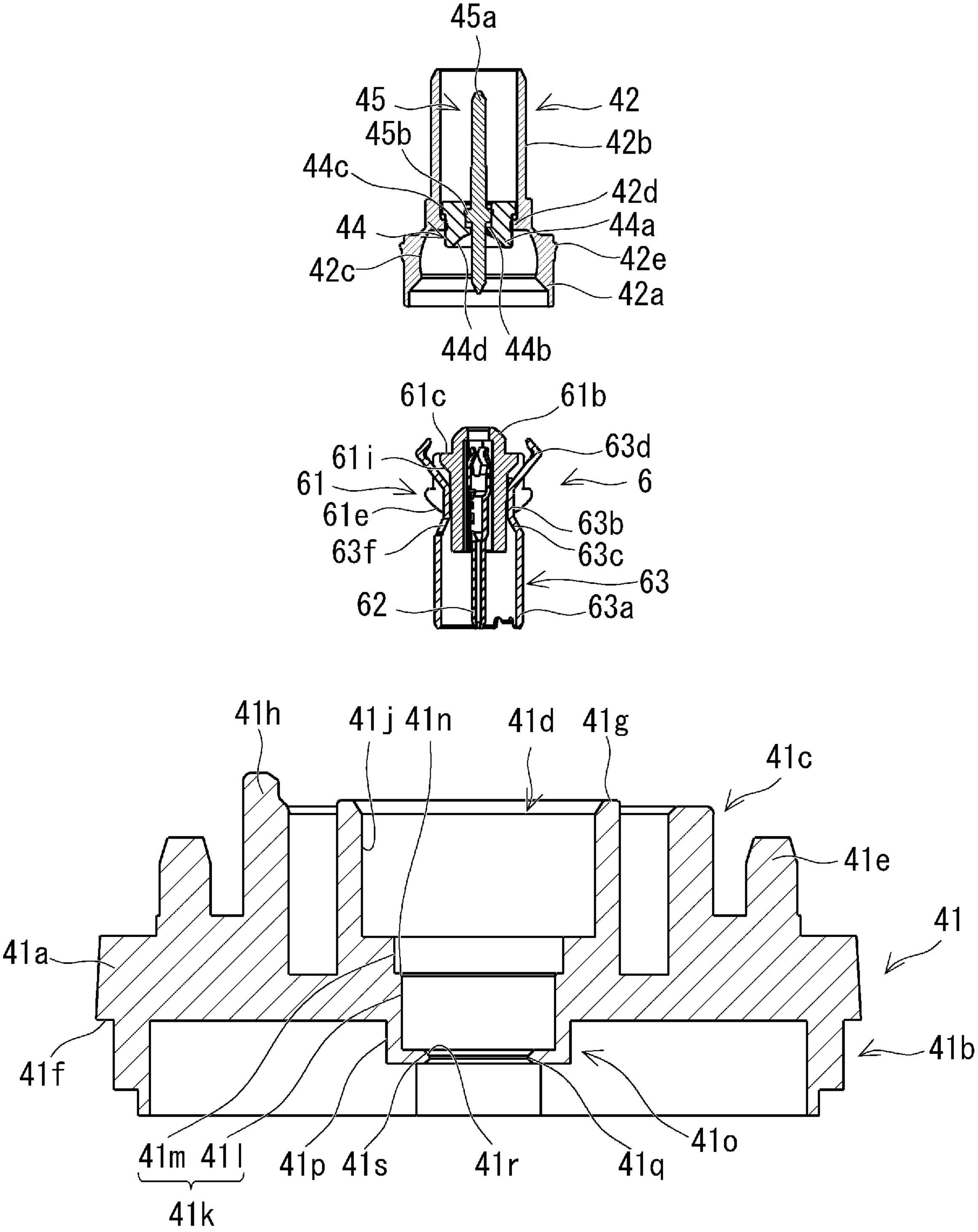
FIG. 17 is a view illustrating the flow of electrically connecting the first connector and the relay connector.

The flow of electrically connecting the first connector 4 and the relay connector 6 is described hereinafter. FIG. 17 is a view illustrating the flow of electrically connecting the first connector and the relay connector. The cross-sectional position in FIG. 17 corresponds to that in FIG. 4. First, a part of the first connector 4 and the relay connector 6 are assembled.

To be specific, the signal terminal 45 of the first connector 4 is inserted into the second housing 44 from the positive side of the z axis, and the flange part 45*b* of the signal terminal 45 is inserted into the second housing 44 until the flange part 45*b* of the signal terminal 45 comes into substantial contact with the projecting part 44*b* of the second housing 44, and thereby the signal terminal 45 and the second housing 44 are fixed to each other.

Next, the second housing 44 to which the signal terminal 45 is fixed is inserted into the ground terminal 42 from the positive side of the z axis, and the flange part 44*c* of the second housing 44 is inserted into the ground terminal 42 until the flange part 44*c* of the second housing 44 comes into substantial contact with the first projecting part 42*d* of the ground terminal 42, and thereby the second housing 44 and the ground terminal 42 are fixed to each other.

A part of the first connector 4 is thereby assembled. In this state, as shown in FIG. 2, a center axis AX1 of the ground terminal 42, a center axis AX4 of the second housing 44, and a center axis AX5 of the signal terminal 45 are substantially coaxially arranged.

At the same time, the part of the relay connector 6 on the positive side of the z axis including the insertion part 62*c* of the signal terminal 62 is inserted into the housing 61 from the negative side of the z axis, and the insertion part 62*c* of the signal terminal 62 is inserted into the insert-receiving part 61*f* of the housing 61, and thereby the housing 61 and the signal terminal 62 are fixed to each other.

In this state, the contact spring part 62*b* of the signal terminal 62 is disposed along the edge of the penetration part 61*h* of the housing 61 when viewed from the z axis direction. Further, the pillar part 62*d* of the signal terminal 62 is disposed inside the penetration part 61*h* of the housing 61 when viewed from the z axis direction.

Then, the part of the housing 61 on the negative side of the z axis is inserted into the ground terminal 63 so that the contact spring part 63*d* of the ground terminal 63 is disposed between the wall parts 61*d* of the housing 61, and further the insertion part 63*e* of the ground terminal 63 is inserted into the insert-receiving part 61*j* of the housing 61, and thereby the housing 61 and the ground terminal 63 are fixed to each other.

The relay connector 6 is thereby assembled. In this state, as shown in FIG. 13, the center axis AX3 of the ground terminal 63, the center axis AX6 of the signal terminal 62, and the center axis AX7 of the housing 61 are substantially coaxially arranged.

After that, the relay connector 6 is inserted into the first connector 4.

To be specific, the relay connector 6 is inserted through the opening on the positive side of the z axis of the penetration part 41*d* of the first housing 41 of the first connector 4.

Then, the part of the ground terminal 63 on the negative side of the z axis in the relay connector 6 passes through the penetration part 41*r* of the stopper part 410 of the first housing 41 in the first connector 4, so that the second spherical part 61*e* of the housing 61 of the relay connector 6 comes into substantial spherical contact with the spherical part 41*s* of the first housing 41. In other words, a first spherical contact part 7 (see FIG. 4) is formed by the spherical part 41*s* of the first housing 41 and the housing 61 of the relay connector 6.

The penetration part 41*d* of the first housing 41 of the first connector 4 has a shape to which the relay connector 6 can be inserted from the positive side of the z axis. Further, the penetration part 41*r* of the first housing 41 of the first connector 4 allows the relay connector 6 to rotate at a specified angle with respect to the center C1 of the spherical part 41*s* (i.e., the first spherical contact part 7) of the first housing 41 of the first connector 4, as described later, and it has a smaller radius than the distance between the external end in the radial direction of the tubular part 61*a* in the second spherical part 61*e* of the housing 61 of the relay connector 6 and the center line AX7 of the housing 61.

The relay connector 6 thereby catches on the stopper part 410 of the first housing 41 of the first connector 4, which prevents the relay connector 6 from coming out from the first connector 4 to the negative side of the z axis.

Then, the ground terminal 42 that is fixed to the signal terminal 45 is inserted through the opening on the positive side of the z axis of the penetration part 41*d* of the first housing 41 of the first connector 4. Then, the first part 42*a* of the ground terminal 42 is inserted into the minor diameter part 41*l* of the second part 41*k* of the penetration part 41*d* of the first housing 41, and the second projecting part 42*e* of the first part 42*a* of the ground terminal 42 is inserted into the minor diameter part 41*l* of the second part 41*k* of the penetration part 41*d* of the first housing 41 until the end of the ground terminal 42 on the negative side of the z axis comes into substantial contact with the stopper part 410, and thereby the first housing 41 and the ground terminal 42 are fixed to each other.

In this state, as shown in FIG. 2, the center axis AX1 of the ground terminal 42, the center axis AX4 of the second housing 44, the center axis AX5 of the signal terminal 45, and the center axis AX8 of the first housing 41 are substantially coaxially arranged in the first connector 4.

After that, the pillar part 45*a* of the signal terminal 45 of the first connector 4 is inserted into the contact spring part 62*b* of the signal terminal 62 of the relay connector 6. The signal terminal 45 of the first connector 4 and the signal terminal 62 of the relay connector 6 are thereby electrically connected.

Further, the contact spring part 63*d* of the ground terminal 63 in the relay connector 6 is inserted into the part inside the ground terminal 42 on the negative side of the z axis in the first connector 4, and the contact point 63*i* of the contact spring part 63*d* comes into substantial point contact with the spherical part 42*c* of the ground terminal 42.

A contact part P1 (see FIG. 5) is thereby made by the spherical part 42*c* of the ground terminal 42 of the first connector 4 and the contact point 63*i* of the contact spring part 63*d* of the ground terminal 63 of the relay connector 6, and the ground terminal 42 of the first connector 4 and the ground terminal 63 of the relay connector 6 are electrically connected.

Since the curvature of the contact point 63*i* is greater than the curvature of the spherical part 42*c* of the ground terminal 42 of the first connector 4 as described above, the contact point 63*i* adequately comes into substantial point contact with the spherical part 42*c* of the ground terminal 42 of the first connector 4.

Then, the spherical part 44*d* of the second housing 44 of the first connector 4 comes into substantially spherical contact with the first spherical part 61*b* of the housing 61 of the relay connector 6. In other words, a second spherical contact part 8 (see FIG. 4) is formed by the spherical part 44*d* of the second housing 44 of the first connector 4 and the first spherical part 61*b* of the housing 61 of the relay connector 6.

In this state, the housing 61 of the relay connector 6 is interposed between the spherical part 41*s* of the first housing 41 of the first connector 4 and the spherical part 44*d* of the second housing 44. Therefore, as shown in FIG. 5, the center C1 of the spherical part 41*s* of the first housing 41 of the first connector 4, the center C2 of the spherical part 42*c* of the ground terminal 42, and the center C3 of the spherical part 44*d* of the second housing 44 (i.e., the second spherical contact part 8) are kept disposed at substantially the same positions.

Thus, the relay connector 6 is rotatable at a specified angle with respect to the center C1 of the spherical part 41*s* of the first housing 41 of the first connector 4. In this state, the contact point 63*i* of the ground terminal 63 of the relay connector 6, i.e., the contact part P1, is disposed substantially on the diameter of the spherical part 41*s* of the first housing 41.

After that, the first potting 43 is applied to the step part 42*f* of the ground terminal 42 of the first connector 4, and also the second potting 46 is applied to the end of the second housing 44 on the positive side of the z axis in the first connector 4. The relay connector 6 is thereby inserted into the first connector 4, and an electrical connection is established between them. In other words, the floating connector 11 is thereby assembled.

A process of assembling the second connector 5 is described hereinafter. First, the part of the signal terminal 54 on the positive side of the z axis including the insertion part 54*d* is inserted into the second housing 53 from the negative side of the z axis, and the insertion part 54*d* of the signal terminal 54 is inserted into the insert-receiving part 53*f* of the second housing 53, and thereby the second housing 53 and the signal terminal 54 are fixed to each other.

At this time, the contact spring part 54*b* of the signal terminal 54 is disposed along the opening of the tubular part 53*a* of the second housing 530 on the positive side of the z axis when viewed from the z axis direction. Further, the leg part 54*c* of the signal terminal 54 is accommodated in the hollow 53g of the second housing 53.

Next, the tubular part 52*a* of the ground terminal 52 is inserted into the first housing 51 from the negative side of the z axis, and the flat part 52*h* of the first contact spring part 52*b* of the ground terminal 52 is brought into contact with the bottom surface of the groove 51*a* of the first housing 51, and also the second curve part 52*k* of the second contact spring part 52*c* is brought into contact with the bottom surface of the hollow 51*b* of the first housing 51, so that the first housing 51 and the ground terminal 52 are fixed to each other.

At this time, when viewed from the y axis direction, the insertion part 52*e* of the ground terminal 52 is disposed at the notch 51*c* on the negative side of the y axis of the first housing 51. Further, the leg part 52*d* of the ground terminal 52 projects outward in the radial direction of the first housing 51 from the first housing 51.

Then, the tubular part 53*a* of the second housing 53 fixed to the signal terminal 54 is inserted from the negative side of the z axis into the tubular part 52*a* of the ground terminal 52 fixed to the first housing 51, and the insertion part 52*e* of the ground terminal 52 is inserted into the insert-receiving part 53*d* of the second housing 53.

The first housing 51, the ground terminal 52, the second housing 53, and the signal terminal 54 are thereby integrally assembled. In this state, the leg part 54*c* of the signal terminal 54 projects outward in the radial direction of the first housing 51 from the notch 51*c* of the first housing 51 on the positive side of the y axis.

In the second connector 5, as shown in FIG. 10, the center axis AX2 of the first housing 51, a center axis AX9 of the ground terminal 52, a center axis AX10 of the second housing 53, and a center axis AX11 of the signal terminal 54 are substantially coaxially arranged.

The flow of electrically connecting the output connector 2 and the imaging unit 3 by using the floating connector assembly 1 according to this embodiment is described hereinafter. As shown in FIG. 1, for example, the output connector 2 has a structure in which the ground terminal 22 and the signal terminal 23 are accommodated in the housing 21. The ground terminal 42 of the first connector 4 is electrically connected to the ground terminal 22 of the output connector 2, and the signal terminal 45 of the first connector 4 is electrically connected to the signal terminal 23.

In this state, the end of the housing 21 of the output connector 2 on the negative side of the z axis is inserted into the second insert-receiving part 41*c* of the first housing 41 of the first connector 4, and the engagement part 21*a* of the housing 21 of the output connector 2 is engaged with the engaged part 41*i* of the first housing 41. The output connector 2 is thereby reliably fixed to the first connector 4.

As shown in FIG. 1, for example, the imaging unit 3 has a structure in which the board 32 on which an imaging element is mounted is accommodated in the housing 31. The leg part 52*d* of the ground terminal 52 of the second connector 5 and the leg part 54*c* of the signal terminal 54 are electrically connected to the board 32 of the imaging unit 3.

Next, the first tubular part 63*a* of the ground terminal 63 of the relay connector 6 is inserted into the tubular part 52*a* of the ground terminal 52 of the second connector 5 from the positive side of the z axis, and thereby the second contact spring part 52*c* of the ground terminal 52 of the second connector 5 is brought into contact with the outer periphery of the first tubular part 63*a* of the ground terminal 63 of the relay connector 6, so that the ground terminal 52 of the second connector 5 and the ground terminal 63 of the relay connector 6 are electrically connected.

At the same time, the pillar part 62*d* of the signal terminal 62 of the relay connector 6 is inserted into the contact spring part 54*b* of the signal terminal 54 of the second connector 5 from the positive side of the z axis, so that the signal terminal 54 of the second connector 5 and the signal terminal 62 of the relay connector 6 are electrically connected. The output connector 2 and the imaging unit 3 are thereby electrically connected through the first connector 4, the second connector 5, and the relay connector 6.

In this state, the end of the housing 31 of the imaging unit 3 on the positive side of the z axis is inserted into the first insert-receiving part 41*b* of the first housing 41 of the first connector 4. The output connector 2 and the imaging unit 3 are thereby fixed to each other with the first housing 41 of the first connector 4 interposed therebetween.

A connection state of the output connector 2 and the imaging unit 3 in the case where a connection axis AX12 between the output connector 2 and the first connector 4 and a connection axis AX13 between the imaging unit 3 and the second connector 5 are out of alignment is described hereinafter.

Figure 18:
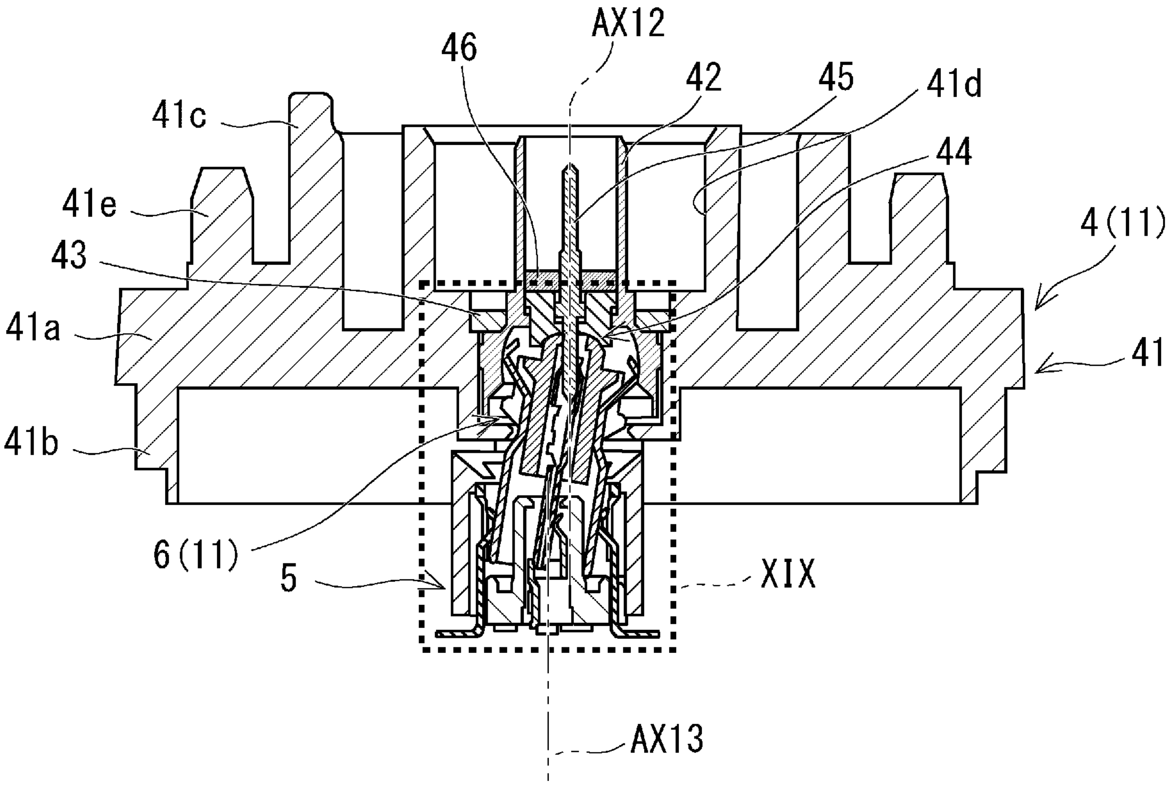
FIG. 18 is a cross-sectional view showing a connected state of an output connector and an imaging unit when a connection axis between the output connector and the first connector and a connection axis between the imaging unit and the second connector are out of alignment.
Figure 19:
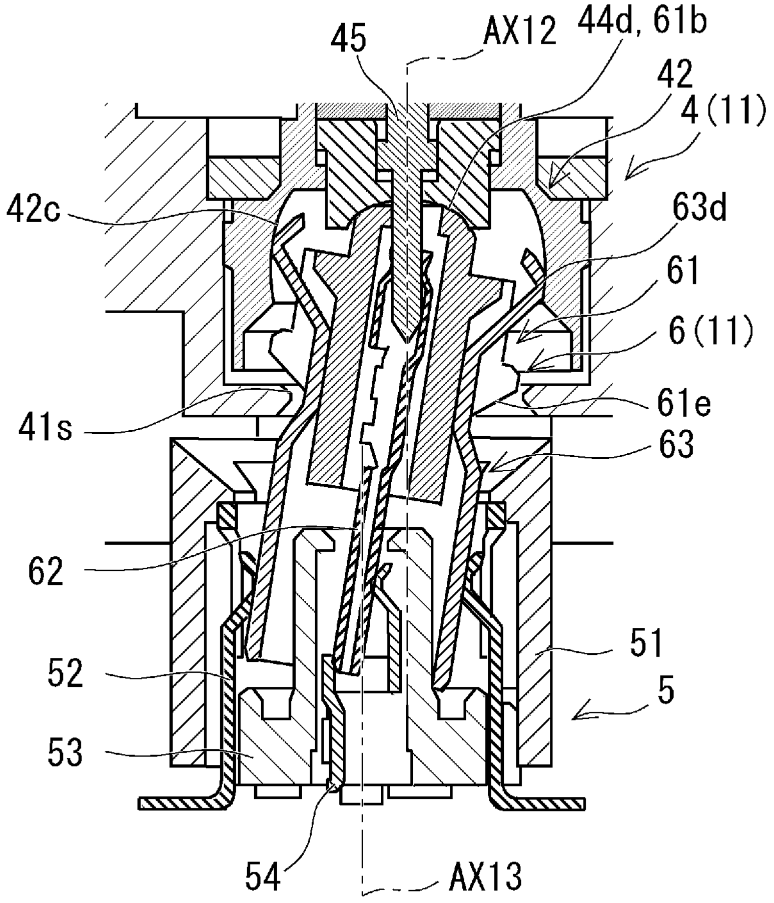
FIG. 19 is an enlarged view of a part XIX shown in FIG. 18.
Figure 20:
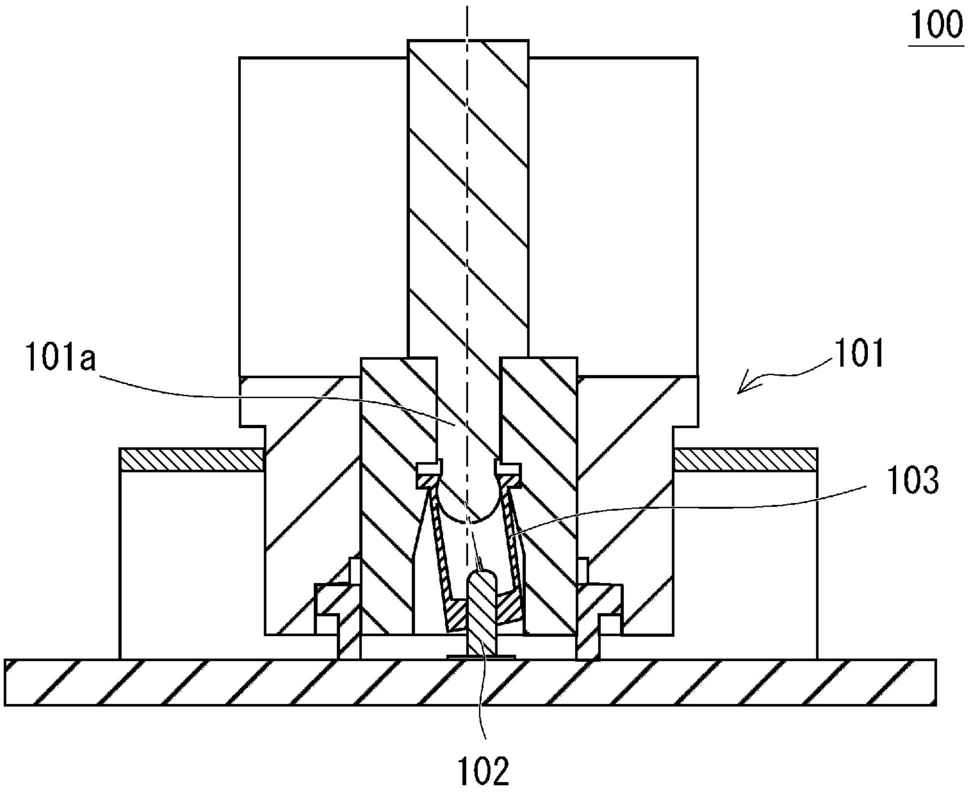
FIG. 20 is a view showing FIG. 5 of Japanese Patent No. 5748311.

FIG. 18 is a cross-sectional view showing the connection state of the output connector and the imaging unit when the connection axis between the output connector and the first connector and the connection axis between the imaging unit and the second connector are out of alignment. FIG. 19 is an enlarged view of a part XIX shown in FIG. 18. Note that the cross-sectional position in FIGS. 18 and 19 corresponds to that in FIG. 4.

As described above, the center C1 of the spherical part 41*s* of the first housing 41 of the first connector 4, the center C2 of the spherical part 42*c* of the ground terminal 42, and the center C3 of the spherical part 44*d* of the second housing 44 are disposed at substantially the same positions. The contact point 63*i* of the ground terminal 63 of the relay connector 6 is disposed substantially on the diameter of the spherical part 41*s* of the first housing 41.

Therefore, the distance between each contact point 63*i* of the ground terminal 63 of the relay connector 6 and the center C1 of the spherical part 41*s* of the first housing 41 of the first connector 4 does not substantially change, and when, as shown in FIGS. 18 and 19, the connection axis AX12 between the output connector 2 and the first connector 4 and the connection axis AX13 between the imaging unit 3 and the second connector 5 are out of alignment, the relay connector 6 rotates with respect to the center C1.

At this time, the contact spring part 62*b* of the signal terminal 62 of the relay connector 6, and the second contact spring part 52*c* of the ground terminal 52 and the contact spring part 54*b* of the signal terminal 54 in the second connector 5 change in shape so as not to inhibit the rotation of the relay connector 6.

Therefore, in the floating connector assembly 1 and the floating connector 11 according to this embodiment, even when the connection axis AX12 between the output connector 2 and the first connector 4 and the connection axis AX13 between the imaging unit 3 and the second connector 5 are out of alignment, the stability of electrical connection is maintained since contact pressures of each contact point 63*i* of the ground terminal 63 of the relay connector 6 on the spherical part 41*s* of the first housing 41 of the first connector 4 are substantially the same.

Further, in the floating connector assembly 1 and the floating connector 11 according to this embodiment, since each contact point 63*i* of the ground terminal 63 of the relay connector 6 is inscribed in the spherical part 41*s* of the first housing 41 of the first connector 4, an increase in the size of the relay connector 6 is minimized, which achieves size reduction of the floating connector assembly 1 and the floating connector 11.

In the floating connector assembly 1 and the floating connector 11 according to this embodiment, the second spherical part 61*e* of the housing 61 of the relay connector 6 catches on the stopper part 410 of the first housing 41 of the first connector 4.

Thus, the floating connector assembly 1 and the floating connector 11 according to this embodiment prevent the relay connector 6 from coming out of the first connector 4 when transporting the relay connector 6 fixed to the first connector 4, for example. Therefore, the floating connector assembly 1 and the floating connector 11 according to this embodiment reduce loss or damage of the relay connector 6 during transportation, for example.

In the floating connector assembly 1 and the floating connector 11 according to this embodiment, the curvature of the contact point 63*i* formed on the contact spring part 63*d* of the ground terminal 63 of the relay connector 6 is greater than the curvature of the spherical part 42*c* of the ground terminal 42 of the first connector 4.

Therefore, in the floating connector assembly 1 and the floating connector 11 according to this embodiment, the contact point 63*i* adequately comes into substantial point contact with the spherical part 42*c* of the ground terminal 42 of the first connector 4. Therefore, in the floating connector assembly 1 and the floating connector 11 according to this embodiment, the relay connector 6 appropriately rotates with respect to the first connector 4.

In the floating connector assembly 1 and the floating connector 11 according to this embodiment, the housing 61 of the relay connector 6 is interposed between the first housing 41 and the second housing 44 of the first connector 4 so that the second spherical part 61*e* of the housing 61 of the relay connector 6 is in substantial spherical contact with the spherical part 41*s* of the first housing 41 of the first connector 4, and the first spherical part 61*b* of the relay connector 6 is in substantial spherical contact with the spherical part 44*d* of the second housing 44 of the first connector 4.

Therefore, the floating connector assembly 1 and the floating connector 11 according to this embodiment allow maintaining the state where the center C1 of the spherical part 41*s* of the first housing 41 of the first connector 4, the center C2 of the spherical part 42*c* of the ground terminal 42, and the center C3 of the spherical part 44*d* of the second housing 44 are disposed at substantially the same positions. Further, the floating connector assembly 1 and the floating connector 11 according to this embodiment allow the contact point 63*i* of the ground terminal 63 of the relay connector 6 to be disposed substantially on the diameter of the spherical part 41*s* of the first housing 41.

Therefore, in the floating connector assembly 1 and the floating connector 11 according to this embodiment, the relay connector 6 rotates with respect to the center C1 without a substantial change in the distance between each contact point 63*i* of the ground terminal 63 of the relay connector 6 and the center C1 of the spherical part 41*s* of the first housing 41 of the first connector 4.

The present disclosure is not limited to the above-described embodiment and can be modified as appropriate without departing from the spirit and scope of the present disclosure.

For example, although the contact point 63*i* is formed on the contact spring part 63*d* of the ground terminal 63 of the relay connector 6 in the above-described embodiment, the contact point 63*i* may be omitted. In this case, it is preferred that the curvature of the curve part 63*g* of the contact spring part 63*d* of the relay connector 6 is set to be greater than the curvature of the spherical part 42*c* of the ground terminal 42 of the first connector 4, and the curve part 63*g* of the contact spring part 63*d* of the relay connector 6 is brought into substantial point contact with the spherical part 42*c* of the ground terminal 42 of the first connector 4.

For example, the shapes of the signal terminal and the ground terminal of each connector are shown merely as typical examples, and the shapes of the signal terminal and the ground terminal of each connector are not particularly limited as long as at least the contact spring part 63*d* of the relay connector 6 comes into contact with the spherical part 42*c* of the ground terminal 42 of the first connector 4 and the relay connector 6 is rotatable.

For example, the shape of the first housing 41 of the first connector 4 is merely a typical example, and it can be modified as appropriate according to the shape of first equipment and second equipment connected thereto.

Further, although the stopper part 410 is formed on the first housing 41 of the first connector 4 in the above-described embodiment, the stopper part 410 may be omitted. In this case, the connection part 63*h* of the contact spring part 63*d* of the ground terminal 63 in the relay connector 6 is inclined outward in the radial direction of the second tubular part 63*b* toward the positive side of the z axis.

When the contact spring part 63*d* of the relay connector 6 is about to come out of the spherical part 42*c* of the ground terminal 42 of the first connector 4 to the negative side of the z axis, the contact spring part 63*d* is pressed inward in the radial direction of the ground terminal 42 along the shape of the spherical part 42*c* and, at this time, the contact spring part 63*d* of the relay connector 6 returns to the state before it is displaced to the negative side of the z axis by the repulsive force of the contact spring part 63*d*. This prevents the relay connector 6 from coming out of the first connector 4.

For example, the relay connector 6 is not necessarily interposed between the first housing 41 and the second housing 44 of the first connector 4. In other words, the structure is not particularly limited as long as at least the contact spring part 63*d* of the relay connector 6 comes into contact with the spherical part 42*c* of the ground terminal 42 of the first connector 4 and the relay connector 6 is rotatable.

In this case, the connection part 63*h* of the contact spring part 63*d* of the ground terminal 63 in the relay connector 6 is inclined outward in the radial direction of the second tubular part 63*b* toward the positive side of the z axis. Therefore, a point of contact between the contact spring part 63*d* of the ground terminal 63 of the relay connector 6 and the spherical part 41*s* of the first housing 41 is disposed on the diameter of the spherical part 41*s* by the repulsive force of the contact spring part 63*d* of the ground terminal 63.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A floating connector constituting a part of a floating connector assembly including a first connector electrically connected to first equipment, a second connector electrically connected to second equipment, and a relay connector inserted into the first connector and also inserted into the second connector to electrically connect the first connector and the second connector, wherein the floating connector includes the relay connector and the first connector, the relay connector includes a first terminal having a plurality of contact spring parts arranged at intervals in a circumferential direction of the first terminal, the first connector includes a second terminal where a tubular part is formed, the tubular part having a spherical part on an inner periphery thereof, the plurality of contact spring parts come into contact with the spherical part in a state of being inserted into the tubular part of the second terminal, and when the relay connector rotates with respect to the first connector, a distance from a center of the spherical part to a contact part between each of the contact spring parts and the spherical part of the second terminal is the same.

2. The floating connector according to claim 1, wherein the contact spring part of the first terminal includes an inclined part inclined outward of the first terminal toward the first connector side in a state where the first connector and the relay connector are electrically connected.

3. The floating connector according to claim 1, wherein the spherical part of the second terminal and the contact spring part of the first terminal come into point contact.

4. The floating connector according to claim 3, wherein a surface of the contact spring part of the first terminal coming into contact with the spherical part of the second terminal includes a curve part having a greater curvature than a curvature of the spherical part.

5. The floating connector according to claim 4, wherein the contact spring part of the first terminal has a contact point on the curve part, and the contact point projects on the spherical part side of the second terminal.

6. The floating connector according to claim 1, wherein the first connector includes a retaining member disposed inside the tubular part of the second terminal and having a spherical part being concave to an opposite side to the relay connector side in a state where the first connector and the relay connector are electrically connected, the relay connector includes a holding member configured to hold the first terminal and having a spherical part being convex to the first connector side in the state where the first connector and the relay connector are electrically connected, and the spherical part of the retaining member of the first connector and the spherical part of the holding member of the relay connector are in spherical contact, and a center of a spherical contact part between the spherical part of the retaining member of the first connector and the spherical part of the holding member of the relay connector coincides with a center of the spherical part of the second terminal of the first connector.

7. A floating connector assembly comprising:

the floating connector according to claim 1; and the second connector.

* * * * *